US012781159B2

(12) United States Patent
Bell-Rusiewicz et al.

(10) Patent No.: US 12,781,159 B2
(45) **Date of Patent: *Nov. 3, 2026**

(54) HOME CARE COMPOSITION COMPRISING AN AMYLASE

(71) Applicant: The Procter & Gamble Company, Cincinnati, OH (US)

(72) Inventors: Katarzyna Dorota Bell-Rusiewicz, Newcastle Upon Tyne (GB); Michelle Jackson, Newcastle Upon Tyne (GB); Ana L. Morales Garcia, Newcastle Upon Tyne (GB); Manasi Bhate, San Francisco, CA (US); Amanda Chan, Townsend, DE (US); Hon Kit Chan, San Francisco, CA (US); Jonathan Lassila, San Francisco, CA (US); Chris Leeflang, Twisk (NL); Sandra W. Ramer, Sunnyvale, CA (US); Patricia Tran, San Jose, CA (US)

(73) Assignee: The Procter & Gamble Company, Cincinnati, OH (US)

( * ) Notice: Subject to any disclaimer, the term of this patent is extended or adjusted under 35 U.S.C. 154(b) by 925 days.

This patent is subject to a terminal disclaimer.

(21) Appl. No.: 18/065,641

(22) Filed: Dec. 14, 2022

(65) Prior Publication Data

US 2023/0265358 A1 Aug. 24, 2023

Related U.S. Application Data

(60) Provisional application No. 63/290,099, filed on Dec. 16, 2021.

(51) Int. Cl.

| | |
|---|---|
| ***C12N 9/26*** | (2006.01) |
| ***C11D 3/386*** | (2006.01) |
| ***C11D 3/39*** | (2006.01) |
| ***C11D 3/395*** | (2006.01) |

(52) U.S. Cl.

CPC ............ *C11D 3/386* (2013.01); *C11D 3/3932* (2013.01); *C11D 3/395* (2013.01); *C11D 2111/14* (2024.01)

(58) Field of Classification Search

None

See application file for complete search history.

(56) References Cited

U.S. PATENT DOCUMENTS

| | | | | |
|---|---|---|---|---|
| 4,760,025 | A | 7/1988 | Estell | |
| 5,679,630 | A | 10/1997 | Baeck | |
| 6,312,936 | B1 | 11/2001 | Poulose | |
| 2003/0129718 | A1 | 7/2003 | Andersen et al. | |
| 2005/0261158 | A1* | 11/2005 | Kottwitz ............ | C11D 3/38618 510/421 |
| 2014/0228274 | A1 | 8/2014 | Mikkelsen | |
| 2019/0185789 | A1* | 6/2019 | Souter ................ | C11D 3/38618 |

FOREIGN PATENT DOCUMENTS

| | | | |
|---|---|---|---|
| DE | 102006022216 | A1 | 11/2007 |
| DE | 102006022224 | A1 | 11/2007 |
| EP | 1022334 | A2 | 7/2000 |
| EP | 2358857 | B1 | 5/2017 |
| WO | 8906270 | A1 | 7/1989 |
| WO | 9217577 | A1 | 10/1992 |
| WO | 9422800 | A1 | 10/1994 |
| WO | 9623873 | A1 | 8/1996 |
| WO | 9700324 | A1 | 1/1997 |
| WO | 9813458 | A1 | 4/1998 |
| WO | 0060060 | A2 | 10/2000 |
| WO | 03054184 | A1 | 7/2003 |
| WO | 03054185 | A1 | 7/2003 |
| WO | 03055974 | A2 | 7/2003 |
| WO | 2004067737 | A2 | 8/2004 |
| WO | 2005052146 | A2 | 6/2005 |
| WO | 2005052161 | A2 | 6/2005 |
| WO | 2005056782 | A2 | 6/2005 |
| WO | 2006000060 | A1 | 1/2006 |
| WO | 2006002643 | A2 | 1/2006 |
| WO | 2007044993 | A2 | 4/2007 |
| WO | 2007106293 | A1 | 9/2007 |
| WO | 2008063400 | A1 | 5/2008 |
| WO | 2008106214 | A1 | 9/2008 |
| WO | 2008106215 | A1 | 9/2008 |
| WO | 2008112459 | A2 | 9/2008 |
| WO | 2009149130 | A2 | 12/2009 |
| WO | 2009149271 | A2 | 12/2009 |
| WO | 2011036153 | A1 | 3/2011 |
| WO | 2011100410 | A2 | 8/2011 |
| WO | 2013001078 | A1 | 1/2013 |
| WO | 2013001087 | A2 | 1/2013 |

(Continued)

OTHER PUBLICATIONS

UniProt Database Accession No. P19571, Dec. 2020, 4 pages (Year: 2020).*
GenPept Database Accession No. WP_100374818, 2019, 1 page (Year: 2019).*
All Office Actions; UU.S. Appl. No. 18/065,643, filed on Dec. 14, 2022.
Unpublished U.S. Appl. No. 18/065,643, filed on Dec. 14, 2022, Katarzyna Dorota Bell-Rusiewicz et al.
PCT Search Report and Written Opinion for PCT/US2022/081481 dated Apr. 25, 2023, 17 pages.

*Primary Examiner* — David Steadman

(74) *Attorney, Agent, or Firm* — Elizabeth A. Conklin; Carolyn S. Powell

(57) ABSTRACT

Home care compositions including a surfactant and an amylase. The amylase includes a recombinant, non-naturally-occurring variant of a parent alpha-amylase, the variant alpha-amylase having at least about 80% identity to SEQ ID NO: 5 and having amino acid substitutions at positions 51 and/or 125 with respect to SEQ ID NO: 5.

19 Claims, 2 Drawing Sheets

Specification includes a Sequence Listing.

(56) References Cited

FOREIGN PATENT DOCUMENTS

| | | | |
|---|---|---|---|
| WO | 2013003659 | A1 | 1/2013 |
| WO | 2014019405 | A1 | 2/2014 |
| WO | 2014099523 | A1 | 6/2014 |
| WO | 2014164777 | A1 | 10/2014 |
| WO | 2014194032 | A1 | 12/2014 |
| WO | 2014194117 | A2 | 12/2014 |
| WO | 2015024739 | A2 | 2/2015 |
| WO | 2015089441 | A1 | 6/2015 |
| WO | 2015089447 | A1 | 6/2015 |
| WO | 2015091989 | A1 | 6/2015 |
| WO | 2015091990 | A1 | 6/2015 |
| WO | 2015143360 | A2 | 9/2015 |
| WO | 2015189371 | A1 | 12/2015 |
| WO | 2015193488 | A1 | 12/2015 |
| WO | 2016066756 | A2 | 5/2016 |
| WO | 2016066757 | A2 | 5/2016 |
| WO | 2016069557 | A1 | 5/2016 |
| WO | 2016069563 | A1 | 5/2016 |
| WO | 2016069569 | A2 | 5/2016 |
| WO | 2016075078 | A2 | 5/2016 |
| WO | 2016091688 | A1 | 6/2016 |
| WO | 2016174234 | A2 | 11/2016 |
| WO | 2016180748 | A1 | 11/2016 |
| WO | 2016183509 | A1 | 11/2016 |
| WO | 2017089093 | A1 | 6/2017 |
| WO | 2017192657 | A1 | 11/2017 |
| WO | 2017215925 | A1 | 12/2017 |
| WO | 2020114965 | A1 | 6/2020 |
| WO | 2020156419 | A1 | 8/2020 |
| WO | 2020221578 | A1 | 11/2020 |
| WO | 2020221579 | A1 | 11/2020 |
| WO | 2020221580 | A1 | 11/2020 |
| WO | 2020264552 | A1 | 12/2020 |
| WO | 2021080948 | A2 | 4/2021 |

* cited by examiner

| | 10 | 20 | 30 | 40 | 50 |
|---|---|---|---|---|---|
| AA2560 | HHNGTNGTMM | QYFEWHLPND | GQHWNRLRND | AANLKNLGIT | AVWIPPAWKG |
| AA707 | HHNGTNGTMM | QYFEWYLPND | GNHWNRLNSD | ASNLKSKGIT | AVWIPPAWKG |
| AA560 | HHNGTNGTMM | QYFEWYLPND | GNHWNRLRSD | ASNLKDKGIS | AVWIPPAWKG |
| AAI10 | HHDGTNGTIM | QYFEWNVPND | GQHWNRLHNN | AQNLKNAGIT | AIWIPPAWKG |

| | 60 | 70 | 80 | 90 | 100 |
|---|---|---|---|---|---|
| AA2560 | TSQNDVGYGA | YDLYDLGEFN | QKGTIRTKYG | TRSQLQSAIA | SLQNNGIQVY |
| AA707 | ASQNDVGYGA | YDLYDLGEFN | QKGTVRTKYG | TRSQLQAAVT | SLKNNGIQVY |
| AA560 | ASQNDVGYGA | YDLYDLGEFN | QKGTIRTKYG | TRNQLQAAVN | ALKSNGIQVY |
| AAI10 | TSQNDVGYGA | YDLYDLGEFN | QKGTVRTKYG | TKAELERAIR | SLKANGIQVY |

| | 110 | 120 | 130 | 140 | 150 |
|---|---|---|---|---|---|
| AA2560 | GDVVMNHKGG | ADGTEWVQAV | EVNPSNRNQE | VTGEYTIEAW | TKFDFPGRGN |
| AA707 | GDVVMNHKGG | ADATEMVRAV | EVNPNNRNQE | VTGEYTIEAW | TRFDFPGRGN |
| AA560 | GDVVMNHKGG | ADATEMVRAV | EVNPNNRNQE | VSGEYTIEAW | TKFDFPGRGN |
| AAI10 | GDVVMNHKGG | ADFTERVQAV | EVNPQNRNQE | VSGTYQIEAW | TGFNFPGRGN |

| | 160 | 170 | 180 | 190 | 200 |
|---|---|---|---|---|---|
| AA2560 | THSSFKWRWY | HFDGTDWDQS | RQLNNRIYKF | RGTGKAWDWE | VDTENGNYDY |
| AA707 | THSSFKWRWY | HFDGVDWDQS | RRLNNRIYKF | RGHGKAWDWE | VDTENGNYDY |
| AA560 | THSNFKWRWY | HFDGVDWDQS | RKLNNRIYKF | RGDGKGWDWE | VDTENGNYDY |
| AAI10 | QHSSFKWRWY | HFDGTDWDQS | RQLANRIYKF | RGDGKAWDWE | VDTENGNYDY |

| | 210 | 220 | 230 | 240 | 250 |
|---|---|---|---|---|---|
| AA2560 | LMYADVDMDH | PEVINELRRW | GVWYTNTLNL | DGFRIDAVKH | IKYSFTRDWL |
| AA707 | LMYADIDMDH | PEVVNELRNW | GVWYTNTLGL | DGFRIDAVKH | IKYSFTRDWI |
| AA560 | LMYADIDMDH | PEVVNELRNW | GVWYTNTLGL | DGFRIDAVKH | IKYSFTRDWI |
| AAI10 | LMYADVDMDH | PEVINELNRW | GVWYANTLNL | DGFRLDAVKH | IKFSFMRDWL |

| | 260 | 270 | 280 | 290 | 300 |
|---|---|---|---|---|---|
| AA2560 | NHVRSTTGKN | NMFAVAEFWK | NDLGAIENYL | HKTNWNHSVF | DVPLHYNLYN |
| AA707 | NHVRSATGK- | NMFAVAEFWK | NDLGAIENYL | QKTNWNHSVF | DVPLHYNLYN |
| AA560 | NHVRSATGK- | NMFAVAEFWK | NDLGAIENYL | NKTNWNHSVF | DVPLHYNLYN |
| AAI10 | GHVRGQTGK- | NLFAVAEYWK | NDLGALENYL | SKTNWTMSAF | DVPLHYNLYQ |

| | 310 | 320 | 330 | 340 | 350 |
|---|---|---|---|---|---|
| AA2560 | ASKSGGNYDM | RQILNGTVVS | KHPIHAVTFV | DNHDSQPAEA | LESFVEAWFK |
| AA707 | ASKSGGNYDM | RNIFNGTVVQ | RHPSHAVTFV | DNHDSQPEEA | LESFVEEWFK |
| AA560 | ASKSGGNYDM | RQIFNGTVVQ | RHPMHAVTFV | DNHDSQPEEA | LESFVEEWFK |
| AAI10 | ASNSSGNYDM | RNLLNGTLVQ | RHPSHAVTFV | DNHDTQPGEA | LESFVQGWFK |

| | 360 | 370 | 380 | 390 | 400 |
|---|---|---|---|---|---|
| AA2560 | PLAYALILTR | EQGYPSVFYG | DYYGIPTHGV | AAMKGKIDPI | LEARQKYAYG |
| AA707 | PLAYALTLTR | EQGYPSVFYG | DYYGIPTHGV | PAMRSKIDPI | LEARQKYAYG |
| AA560 | PLAYALTLTR | EQGYPSVFYG | DYYGIPTHGV | PAMKSKIDPI | LEARQKYAYG |
| AAI10 | PLAYATILTR | EQGYPQVFYG | DYYGIPSDGV | PSYRQQIDPL | LKARQQYAYG |

FIG. 1A

```
                    410        420        430        440        450
AA2560     TQHDYLDHHN IIGWTREGNS AHPNSGLATI MSDGPGGSKW MYVGRHKAGQ
AA707      KQNDYLDHHN IIGWTREGNT AHPNSGLATI MSDGAGGSKW MFVGRNKAGQ
AA560      RQNDYLDHHN IIGWTREGNT AHPNSGLATI MSDGAGGNKW MFVGRNKAGQ
AAI10      RQHDYFDHWD VIGWTREGNA SHPNSGLATI MSDGPGGSKW MYVGRQKAGE

                    460        470        480
AA2560     VWRDITGNRT GTVTINADGW GNFSVNGGSV SIWVNK (SEQ ID NO: 1)
AA707      VWSDITGNRT GTVTINADGW GNFSVNGGSV SIWVNK (SEQ ID NO: 2)
AA560      VWTDITGNRA GTVTINADGW GNFSVNGGSV SIWVNK (SEQ ID NO: 3)
AAI10      VWHDMTGNRS GTVTINQDGW GHFFVNGGSV SVWVKR (SEQ ID NO: 4)
```

FIG. 1B

HOME CARE COMPOSITION COMPRISING AN AMYLASE

INCORPORATION BY REFERENCE

A sequence listing that sets forth the nucleotide sequence for the present application was filed as an xml text file titled "CM05381 Sequence ST26 corrected for USPTO.xml" on Jan. 11, 2023. This xml file was created on Jan. 9, 2023 and is approximately 12,616 bytes in size. In accordance with MPEP § 605.08 and 37 CFR § 1.52(e), the subject matter in the xml file is incorporated herein by reference to the application.

PARTIES OF JOINT RESEARCH AGREEMENT

The claimed subject matter of the present application was made by or on behalf of the below parties to a joint research agreement. The joint research agreement was in effect on or before the date the claimed invention was made and the claimed invention was made as a result of activities undertaken with the scope of the joint research agreement. The parties to the joint research agreement are The Procter & Gamble Company and Danisco.

TECHNICAL FIELD

The present disclosure is in the field of home care compositions. In particular, the present disclosure relates to automatic dishwashing detergent compositions.

BACKGROUND

Starch consists of a mixture of amylose (15-30% w/w) and amylopectin (70-85% w/w). Amylose consists of linear chains of α-1,4-linked glucose units having a molecular weight (MW) from about 60,000 to about 800,000. Amylopectin is a branched polymer containing α-1,6-branch points every 24-30 glucose units; its MW may be as high as 100 million.

α-amylases hydrolyze starch, glycogen, and related polysaccharides by cleaving internal α-1,4-glucosidic bonds at random. α-amylases, particularly from Bacilli, have been used for a variety of different purposes, including starch liquefaction and saccharification, starch modification in the paper and pulp industry, brewing, baking, production of syrups for the food industry, production of feed-stocks for fermentation processes, and in animal feed to increase digestability. These enzymes can also be used to remove starchy soils and stains during dishwashing.

The products produced by the hydrolysis of starch by α-amylases vary in terms of the number of contiguous glucose molecules. Most commercial α-amylases produce a range of products from glucose (G1) to maltoheptaose (G7). For reasons that are not entirely clear, α-amylases that produce significant amounts of maltopentaose and maltohexaose appear to be especially useful for certain commercial applications, including incorporation into detergent cleaning compositions. Numerous publications have described mutations in maltopentaose/maltohexaose-producing α-amylases and others. Nonetheless, the need continues to exist for ever-more robust and better performing engineered α-amylases molecules.

SUMMARY

The present disclosure relates to a home care composition comprising a surfactant and amylase, wherein the amylase is a recombinant, non-naturally-occurring variant of a parent alpha-amylase, the variant alpha-amylase having at least 80% identity, preferably at least 85% identity, preferably at least 86% identity, preferably at least 87% identity, preferably at least 88% identity, preferably at least 89% identity, preferably at least 90% identity, preferably at least 95% identity, preferably at least 96% identity, preferably at least 97%, preferably at least 98% identity, preferably at least 99% identity to SEQ ID NO: 5 and having amino acid substitutions at positions 51 and/or 125 with respect to SEQ ID NO: 5.

BRIEF DESCRIPTION OF THE DRAWINGS

FIGS. 1A and 1B show an alignment of four a-amylases, according to embodiments of the present disclosure.

DETAILED DESCRIPTION

Home Care Composition

The present disclosure encompasses a home care composition.

Typically, home care composition means consumer and institutional compositions, including but not limited to dishwashing, and hard surface cleaning compositions, other cleaners, and cleaning systems all for the care and cleaning of inanimate surfaces, and air care compositions.

The composition is a home care composition. Typically, home care composition means consumer and institutional compositions, including but not limited to dishwashing, and hard surface cleaning compositions, other cleaners, and cleaning systems all for the care and cleaning of inanimate surfaces, as well as other compositions designed specifically for the care and maintenance of the home.

In particular, the composition is an automatic dishwashing composition. The composition comprises an amylase.

The composition is typically a cleaning composition. Cleaning compositions and cleaning formulations include any composition that is suited for cleaning, bleaching, disinfecting, and/or sterilizing any object, item, and/or surface. Such compositions and formulations include, but are not limited to, for example, liquid and/or solid compositions, including cleaning or detergent compositions (e.g., liquid, tablet, gel, bar, granule, and/or solid cleaning or detergent compositions; hard surface cleaning compositions and formulations, such as for glass, wood, ceramic and metal counter tops and windows; carpet cleaners; oven cleaners; dishwashing compositions, including hand or manual dishwashing compositions (e.g., "hand" or "manual" dishwashing detergents) and automatic dishwashing compositions (e.g., "automatic dishwashing detergents"). Single dosage unit forms also find use with the present disclosure, including but not limited to pills, tablets, gelcaps, or other single dosage units such as pre-measured powders or liquids.

Cleaning composition or cleaning formulations, as used herein, include, unless otherwise indicated, granular or powder-form all-purpose or heavy-duty washing agents, especially cleaning detergents; liquid, granular, gel, solid, tablet, paste, or unit dosage form all-purpose washing agents, especially the so-called heavy-duty liquid (HDL) detergent or heavy-duty dry (HDD) detergent types; hand or manual dishwashing agents, including those of the high-foaming type; hand or manual dishwashing, automatic dishwashing, or dishware or tableware washing agents, including the various tablet, powder, solid, granular, liquid, gel, and rinse-aid types for household and institutional use; liquid cleaning and disinfecting agents, including antibacterial hand-wash types, cleaning bars, mouthwashes, denture cleaners, car shampoos, carpet shampoos, bathroom cleaners; hair shampoos and/or hair-rinses for humans and other animals; shower gels and foam baths and metal cleaners; as well as cleaning auxiliaries, such as bleach additives and "stain-stick" or pre-treat types. In some embodiments, granular compositions are in "compact" form; in some embodiments, liquid compositions are in a "concentrated" form.

The term "detergent composition" or "detergent formulation" is used in reference to a composition intended for use in a wash medium for the cleaning of soiled or dirty objects. In some embodiments, the detergents of the disclosure comprise one or more amylases described herein and, in addition, one or more surfactants, transferase(s), hydrolytic enzymes, oxido reductases, builders (e.g., a builder salt), bleaching agents, bleach activators, bluing agents, fluorescent dyes, caking inhibitors, masking agents, enzyme stabilizers, calcium, enzyme activators, antioxidants, and/or solubilizers. In some instances, a builder salt is a mixture of a silicate salt and a phosphate salt, preferably with more silicate (e.g., sodium metasilicate) than phosphate (e.g., sodium tripolyphosphate). Some embodiments are directed to cleaning compositions or detergent compositions that do not contain any phosphate (e.g., phosphate salt or phosphate builder).

The term "adjunct material" refers to any liquid, solid, or gaseous material included in cleaning composition other than the amylase described herein, or recombinant polypeptide or active fragment thereof. In some embodiments, the cleaning compositions of the present disclosure include one or more cleaning adjunct materials. Each cleaning adjunct material is typically selected depending on the particular type and form of cleaning composition (e.g., liquid, granule, powder, bar, paste, spray, tablet, gel, foam, or other composition). Preferably, each cleaning adjunct material is compatible with the amylase enzyme used in the composition.

The phrase "composition(s) substantially-free of boron" or "detergent(s) substantially-free of boron" refers to composition(s) or detergent(s), respectively, that contain trace amounts of boron, for example, less than about 1000 ppm (1 mg/kg or liter equals 1 ppm), less than about 100 ppm, less than about 50 ppm, less than about 10 ppm, or less than about 5 ppm, or less than about 1 ppm, perhaps from other compositions or detergent constituents.

The term "bleaching" refers to the treatment of a material or surface for a sufficient length of time and/or under appropriate pH and/or temperature conditions to effect a brightening (i.e., whitening) and/or cleaning of the material. Examples of chemicals suitable for bleaching include, but are not limited to, for example, $ClO_2$, $H_2O_2$, peracids, $NO_2$, etc. Bleaching agents also include enzymatic bleaching agents such as perhydrolase and arylesterases. Another embodiment is directed to a composition comprising one or more amylases described herein, and one or more perhydrolase, such as, for example, is described in WO2005/056782, WO2007/106293, WO 2008/063400, WO2008/106214, and WO2008/106215.

The term "wash performance" of a protease (e.g., one or more amylases described herein, or recombinant polypeptide or active fragment thereof) refers to the contribution of one or more amylases described herein to washing that provides additional cleaning performance to the detergent as compared to the detergent without the addition of the one or more amylases described herein to the composition. Wash performance is compared under relevant washing conditions. In some test systems, other relevant factors, such as detergent composition, suds concentration, water hardness, washing mechanics, time, pH, and/or temperature, can be controlled in such a way that condition(s) typical for household application in a certain market segment (e.g., hand or manual dishwashing, automatic dishwashing, dishware cleaning, tableware cleaning, etc.) are imitated.

The phrase "relevant washing conditions" is used herein to indicate the conditions, particularly washing temperature, time, washing mechanics, suds concentration, type of detergent and water hardness, actually used in households in a hand dishwashing, automatic dishwashing detergent market segment.

The term "dish wash" refers to both household and industrial dish washing and relates to both automatic dish washing (e.g. in a dishwashing machine) and manual dishwashing (e.g. by hand).

The term "disinfecting" refers to the removal of contaminants from the surfaces, as well as the inhibition or killing of microbes on the surfaces of items.

The term "compact" form of the cleaning compositions herein is best reflected by density and, in terms of composition, by the amount of inorganic filler salt. Inorganic filler salts are conventional ingredients of detergent compositions in powder form. In conventional detergent compositions, the filler salts are present in substantial amounts, typically about 17 to about 35% by weight of the total composition. In contrast, in compact compositions, the filler salt is present in amounts not exceeding about 15% of the total composition. In some embodiments, the filler salt is present in amounts that do not exceed about 10%, or more preferably, about 5%, by weight of the composition. In some embodiments, the inorganic filler salts are selected from the alkali and alkaline-earth-metal salts of sulfates and chlorides. In some embodiments, the filler salt is sodium sulfate.

Amylase

Typically, the present compositions and methods relate to variant maltopentaose/maltohexaose-forming amylase polypeptides, and methods of use, thereof. Aspects and embodiments of the present compositions and methods are summarized in the following separately-numbered paragraphs:

The recombinant, non-naturally-occurring variant of a parent alpha-amylase is provided, the variant alpha-amylase having at least 80% identity, preferably at least 85% identity, preferably at least 86% identity, preferably at least 87% identity, preferably at least 88% identity, preferably at least 89% identity, preferably at least 90% identity, preferably at least 95% identity, preferably at least 96% identity, preferably at least 97% identity, preferably at least 98% identity, or preferably at least 99% identity to SEQ ID NO: 5 and having amino acid substitutions at positions 51 and/or 125 with respect to SEQ ID NO: 5.

The variant alpha-amylase may have amino acid substitutions acid substitutions at positions 51 and 125 with respect to SEQ ID NO: 5.

The variant alpha-amylase may have the amino acid substitutions T51V and/or S125R with respect to SEQ ID NO: 5.

The variant alpha-amylase may have the amino acid substitutions T51V and S125R with respect to SEQ ID NO: 5.

The variant alpha-amylase may further comprise one or more, or two or more amino acid substitution at positions 172, 227 and/or 231 with respect to SEQ ID NO: 5.

The variant alpha-amylase may further comprise amino acid substitutions at positions 172, 227 and 231 with respect to SEQ ID NO: 5.

The variant alpha-amylase may further comprise one or more, or two or more of the amino acid substitutions N172Q, N227R and/or F231L with respect to SEQ ID NO: 5.

The variant alpha-amylase may further comprise the amino acid substitutions N172Q, N227R and F231L with respect to SEQ ID NO: 5.

The variant alpha-amylase may have the amino acid substitution (a) T51V+S125R+F231L;

(b) T51V+S125R+N172Q+N227R; or (c) N29Q+T51V+S125R+N227R+S253L+G272E+K319R+S418A, with respect to SEQ ID NO: 5.

Described are compositions and methods relating to variant maltopentaose/maltohexaose-forming amylase enzymes. The variants were discovered by various experimental approaches as detailed in the appended Examples. Exemplary applications for the variant amylase enzymes are for cleaning starchy stains in dishwashing and other applications, for starch liquefaction and saccharification, in animal feed for improving digestibility, and for baking and brewing. These and other aspects of the compositions and methods are described in detail, below.

The terms "α-amylase" or "amylolytic enzyme" or generally amylase refer to an enzyme that is, among other things, capable of catalyzing the degradation of starch. α-Amylases are hydrolases that cleave the α-D-(1→4) O-glycosidic linkages in starch. Generally, α-amylases (EC 3.2.1.1; α-D-(1→4)-glucan glucanohydrolase) are defined as endo-acting enzymes cleaving α-D-(1→4) O-glycosidic linkages within the starch molecule in a random fashion yielding polysaccharides containing three or more (1-4)-α-linked D-glucose units. In contrast, the exo-acting amylolytic enzymes, such as β-amylases (EC 3.2.1.2; α-D-(1→4)-glucan maltohydrolase) and some product-specific α-amylases like maltogenic α-amylase (EC 3.2.1.133) cleave the polysaccharide molecule from the non-reducing end of the substrate. β-amylases, α-glucosidases (EC 3.2.1.20; α-D-glucoside glucohydrolase), glucoamylase (EC 3.2.1.3; α-D-(1→4)-glucan glucohydrolase), and product-specific amylases like the maltotetraosidases (EC 3.2.1.60) and the maltohexaosidases (EC 3.2.1.98) can produce malto-oligosaccharides of a specific length or enriched syrups of specific maltooligosaccharides. Some bacterial α-amylases predominantly produce maltotetraose (G4), maltopentaose (G5) or maltohexaose (G6) from starch and related α-1,4-glucans, while most α-amylases further convert them to glucose and or maltose as final products. G6 amylases such as AA560 amylase derived from *Bacillus* sp. DSM 12649 (i.e., the parent of STAINZYME™) and *Bacillus* sp. 707 amylase, which are also called maltohexaose-forming α-amylases (EC 3.2.1.98), are technically exo acting, but have similar structures compared to α-amylases, and in some cases appear to respond to the some of the same beneficial mutations.

"Enzyme units" herein refer to the amount of product formed per time under the specified conditions of the assay. For example, a "glucoamylase activity unit" (GAU) is defined as the amount of enzyme that produces 1 g of glucose per hour from soluble starch substrate (4% DS) at 60° C., pH 4.2. A "soluble starch unit" (SSU) is the amount of enzyme that produces 1 mg of glucose per minute from soluble starch substrate (4% DS) at pH 4.5, 50° C. DS refers to "dry solids."

The term "starch" refers to any material comprised of the complex polysaccharide carbohydrates of plants, comprised of amylose and amylopectin with the formula $(C_6H_{10}O_5)_x$, wherein X can be any integer. The term includes plant-based materials such as grains, cereal, grasses, tubers and roots, and more specifically materials obtained from wheat, barley, corn, rye, rice, sorghum, brans, cassava, millet, milo, potato, sweet potato, and tapioca. The term "starch" includes granular starch. The term "granular starch" refers to raw, i.e., uncooked starch, e.g., starch that has not been subject to gelatinization.

As used herein, the term "liquefaction" or "liquefy" means a process by which starch is converted to less viscous and shorter chain dextrins.

The terms, "wild-type," "parental," or "reference," with respect to a polypeptide, refer to a naturally-occurring polypeptide that does not include a man-made substitution, insertion, or deletion at one or more amino acid positions. Similarly, the terms "wild-type," "parental," or "reference," with respect to a polynucleotide, refer to a naturally-occurring polynucleotide that does not include a man-made nucleoside change. However, note that a polynucleotide encoding a wild-type, parental, or reference polypeptide is not limited to a naturally-occurring polynucleotide, and encompasses any polynucleotide encoding the wild-type, parental, or reference polypeptide.

Reference to the wild-type polypeptide is understood to include the mature form of the polypeptide. A "mature" polypeptide or variant, thereof, is one in which a signal sequence is absent, for example, cleaved from an immature form of the polypeptide during or following expression of the polypeptide.

The term "variant," with respect to a polypeptide, refers to a polypeptide that differs from a specified wild-type, parental, or reference polypeptide in that it includes one or more naturally-occurring or man-made substitutions, insertions, or deletions of an amino acid. Similarly, the term "variant," with respect to a polynucleotide, refers to a polynucleotide that differs in nucleotide sequence from a specified wild-type, parental, or reference polynucleotide. The identity of the wild-type, parental, or reference polypeptide or polynucleotide will be apparent from context.

In the case of the present α-amylases, "activity" refers to α-amylase activity, which can be measured as described, herein.

The term "performance benefit" refers to an improvement in a desirable property of a molecule. Exemplary performance benefits include, but are not limited to, increased hydrolysis of a starch substrate, increased grain, cereal or other starch substrate liquifaction performance, increased cleaning performance, increased thermal stability, increased detergent stability, increased storage stability, increased solubility, an altered pH profile, decreased calcium dependence, increased specific activity, modified substrate specificity, modified substrate binding, modified pH-dependent activity, modified pH-dependent stability, increased oxidative stability, and increased expression. In some cases, the performance benefit is realized at a relatively low temperature. In some cases, the performance benefit is realized at relatively high temperature.

The terms "protease" and "proteinase" refer to an enzyme protein that has the ability to perform "proteolysis" or "proteolytic cleavage" which refers to hydrolysis of peptide bonds that link amino acids together in a peptide or polypeptide chain forming the protein. This activity of a protease as a protein-digesting enzyme is referred to as "proteolytic activity."

The terms "serine protease" refers to enzymes that cleave peptide bonds in proteins, in which enzymes serine serves as the nucleophilic amino acid at the enzyme active site. Serine proteases fall into two broad categories based on their structure: chymotrypsin-like (trypsin-like) or subtilisin-like. Most commonly used in dishwashing detergents are serine protease, particularly subtlisins.

"Combinatorial variants" are variants comprising two or more mutations, e.g., 2, 3, 4, 5, 6, 7, 8, 9, 10, or more, substitutions, deletions, and/or insertions.

The term "recombinant," when used in reference to a subject cell, nucleic acid, protein or vector, indicates that the subject has been modified from its native state. Thus, for example, recombinant cells express genes that are not found within the native (non-recombinant) form of the cell, or express native genes at different levels or under different conditions than found in nature. Recombinant nucleic acids differ from a native sequence by one or more nucleotides and/or are operably linked to heterologous sequences, e.g., a heterologous promoter in an expression vector. Recombinant proteins may differ from a native sequence by one or more amino acids and/or are fused with heterologous sequences. A vector comprising a nucleic acid encoding an amylase is a recombinant vector.

The terms "recovered," "isolated," and "separated," refer to a compound, protein (polypeptides), cell, nucleic acid, amino acid, or other specified material or component that is removed from at least one other material or component with which it is naturally associated as found in nature. An "isolated" polypeptides, thereof, includes, but is not limited to, a culture broth containing secreted polypeptide expressed in a heterologous host cell.

The term "purified" refers to material (e.g., an isolated polypeptide or polynucleotide) that is in a relatively pure state, e.g., at least about 90% pure, at least about 95% pure, at least about 98% pure, or even at least about 99% pure.

The term "enriched" refers to material (e.g., an isolated polypeptide or polynucleotide) that is in about 50% pure, at least about 60% pure, at least about 70% pure, or even at least about 70% pure.

The terms "thermostable" and "thermostability," with reference to an enzyme, refer to the ability of the enzyme to retain activity after exposure to an elevated temperature. The thermostability of an enzyme, such as an amylase enzyme, is measured by its half-life (t1/2) given in minutes, hours, or days, during which half the enzyme activity is lost under defined conditions. The half-life may be calculated by measuring residual α-amylase activity following exposure to (i.e., challenge by) an elevated temperature.

A "pH range," with reference to an enzyme, refers to the range of pH values under which the enzyme exhibits catalytic activity.

The terms "pH stable" and "pH stability," with reference to an enzyme, relate to the ability of the enzyme to retain activity over a wide range of pH values for a predetermined period of time (e.g., 15 min., 30 min., 1 hour).

The term "amino acid sequence" is synonymous with the terms "polypeptide," "protein," and "peptide," and are used interchangeably. Where such amino acid sequences exhibit activity, they may be referred to as an "enzyme." The conventional one-letter or three-letter codes for amino acid residues are used, with amino acid sequences being presented in the standard amino-to-carboxy terminal orientation (i.e., N→C).

The term "nucleic acid" encompasses DNA, RNA, heteroduplexes, and synthetic molecules capable of encoding a polypeptide. Nucleic acids may be single stranded or double stranded, and may contain chemical modifications. The terms "nucleic acid" and "polynucleotide" are used interchangeably. Because the genetic code is degenerate, more than one codon may be used to encode a particular amino acid, and the present compositions and methods encompass nucleotide sequences that encode a particular amino acid sequence. Unless otherwise indicated, nucleic acid sequences are presented in 5'-to-3' orientation.

A "synthetic" molecule is produced by in vitro chemical or enzymatic synthesis rather than by an organism.

The term "introduced" in the context of inserting a nucleic acid sequence into a cell, means "transfection", "transformation" or "transduction," as known in the art.

A "host strain" or "host cell" is an organism into which an expression vector, phage, virus, or other DNA construct, including a polynucleotide encoding a polypeptide of interest (e.g., an amylase) has been introduced. Exemplary host strains are microorganism cells (e.g., bacteria, filamentous fungi, and yeast) capable of expressing the polypeptide of interest and/or fermenting saccharides. The term "host cell" includes protoplasts created from cells.

The term "heterologous" with reference to a polynucleotide or protein refers to a polynucleotide or protein that does not naturally occur in a host cell.

The term "endogenous" with reference to a polynucleotide or protein refers to a polynucleotide or protein that occurs naturally in the host cell.

The term "expression" refers to the process by which a polypeptide is produced based on a nucleic acid sequence. The process includes both transcription and translation.

A "signal sequence" is a sequence of amino acids attached to the N-terminal portion of a protein, which facilitates the secretion of the protein outside the cell. The mature form of an extracellular protein lacks the signal sequence, which is cleaved off during the secretion process.

"Biologically active" refer to a sequence having a specified biological activity, such an enzymatic activity.

The term "specific activity" refers to the number of moles of substrate that can be converted to product by an enzyme or enzyme preparation per unit time under specific conditions. Specific activity is generally expressed as units (U)/mg of protein.

As used herein, "water hardness" is a measure of the minerals (e.g., calcium and magnesium) present in water.

"A cultured cell material comprising an amylase" or similar language, refers to a cell lysate or supernatant (including media) that includes an amylase as a component. The cell material may be from a heterologous host that is grown in culture for the purpose of producing the amylase.

"Percent sequence identity" means that a particular sequence has at least a certain percentage of amino acid residues identical to those in a specified reference sequence, when aligned using sofware programs such as the CLUSTAL W algorithm with default parameters. See Thompson et al. (1994) Nucleic Acids Res. 22:4673-4680. Default parameters for the CLUSTAL W algorithm are:

Gap opening penalty: 10.0
Gap extension penalty: 0.05
Protein weight matrix: BLOSUM series
DNA weight matrix: IUB
Delay divergent sequences %: 40
Gap separation distance: 8
DNA transitions weight: 0.50
List hydrophilic residues: GPSNDQEKR
Use negative matrix: OFF
Toggle Residue specific penalties: ON
Toggle hydrophilic penalties: ON Toggle end gap separation penalty OFF Deletions are counted as non-identical residues, compared to a reference sequence.

The term "dry solids content" (ds) refers to the total solids of a slurry in a dry weight percent basis. The term "slurry" refers to an aqueous mixture containing insoluble solids.

The phrase "simultaneous saccharification and fermentation (SSF)" refers to a process in the production of biochemicals in which a microbial organism, such as an ethanologenic microorganism, and at least one enzyme, such as an amylase, are present during the same process step. SSF includes the contemporaneous hydrolysis of starch substrates (granular, liquefied, or solubilized) to saccharides, including glucose, and the fermentation of the saccharides into alcohol or other biochemical or biomaterial in the same reactor vessel.

An "ethanologenic microorganism" refers to a microorganism with the ability to convert a sugar or oligosaccharide to ethanol.

The term "fermented beverage" refers to any beverage produced by a method comprising a fermentation process, such as a microbial fermentation, e.g., a bacterial and/or fungal fermentation.

The term "malt" refers to any malted cereal grain, such as malted barley or wheat.

The term "mash" refers to an aqueous slurry of any starch and/or sugar containing plant material, such as grist, e.g., comprising crushed barley malt, crushed barley, and/or other adjunct or a combination thereof, mixed with water later to be separated into wort and spent grains.

The term "wort" refers to the unfermented liquor run-off following extracting the grist during mashing.

The term "about" refers to ±15% to the referenced value.

2. Maltopentaose/Maltohexaose-Forming α-Amylase Variants

Described are combinatorial variants of maltopentaose/maltohexaose-forming α-amylases that show a high degree of performance in automatic dishwashing (ADW) applications The variants are most closely related to an α-amylase from a *Bacillus* sp., herein, refered to as AA2560, and previously identified as BspAmy24 (SEQ ID NO: 1) in WO 2018/184004. The mature amino acid sequence of AA2560 α-amylase is shown, below, as SEQ ID NO: 1:

```
HHNGTNGTMM QYFEWHLPND GQHWNRLRND
AANLKNLGIT AVWIPPAWKG
TSQNDVGYGA YDLYDLGEFN QKGTIRTKYG
TRSQLQSAIA SLQNNGIQVY
GDVVMNHKGG ADGTEWVQAV EVNPSNRNQE
VTGEYTIEAW TKFDFPGRGN
THSSFKWRWY HFDGTDWDQS RQLNNRIYKF
RGTGKAWDWE VDTENGNYDY
LMYADVDMDH PEVINELRRW GVWYTNTLNL
DGFRIDAVKH IKYSFTRDWL
NHVRSTTGKN NMFAVAEFWK NDLGAIENYL
HKTNWNHSVF DVPLHYNLYN
```

-continued

```
ASKSGGNYDM RQILNGTVVS KHPIHAVTFV
DNHDSQPAEA LESFVEAWFK
PLAYALILTR EQGYPSVFYG DYYGIPTHGV
AAMKGKIDPI LEARQKYAYG
TQHDYLDHHN IIGWTREGNS AHPNSGLATI
MSDGPGGSKW MYVGRHKAGQ
VWRDITGNRT GTVTINADGW GNFSVNGGSV SIWVNK
```

A closely related maltopentaose/maltohexaose-forming α-amylase is from *Bacillus* sp. 707, herein, refered to as "AA707." The mature amino acid sequence of AA707 α-is shown, below, as SEQ ID NO: 2:

```
HHNGTNGTMM QYFEWYLPND GNHWNRLNSD
ASNLKSKGIT AVWIPPAWKG
ASQNDVGYGA YDLYDLGEFN QKGTVRTKYG
TRSQLQAAVT SLKNNGIQVY
GDVVMNHKGG ADATEMVRAV EVNPNNRNQE
VTGEYTIEAW TRFDFPGRGN
THSSFKWRWY HFDGVDWDQS RRLNNRIYKF
RGHGKAWDWE VDTENGNYDY
LMYADIDMDH PEVVNELRNW GVWYTNTLGL
DGFRIDAVKH IKYSFTRDWI
NHVRSATGKN MFAVAEFWKN DLGAIENYLQ
KTNWNHSVFD VPLHYNLYNA
SKSGGNYDMR NIFNGTVVQR HPSHAVTFVD
NHDSQPEEAL ESFVEEWFKP
LAYALTLTRE QGYPSVFYGD YYGIPTHGVP
AMRSKIDPIL EARQKYAYGK
QNDYLDHHNI IGWTREGNTA HPNSGLATIM
SDGAGGSKWM FVGRNKAGQV
WSDITGNRTG TVTINADGWG NFSVNGGSVS IWVNK
```

Another closely related maltopentaose/maltohexaose-forming α-amylase is from a *Bacillus* sp. referred to as AA560. The mature amino acid sequence of AA560 is shown, below, as SEQ ID NO: 3:

```
HHNGTNGTMM QYFEWYLPND GNHWNRLRSD
ASNLKDKGIS AVWIPPAWKG
ASQNDVGYGA YDLYDLGEFN QKGTIRTKYG
TRNQLQAAVN ALKSNGIQVY
GDVVMNHKGG ADATEMVRAV EVNPNNRNQE
VSGEYTIEAW TKFDFPGRGN
THSNFKWRWY HFDGVDWDQS RKLNNRIYKF
```

-continued

RGDGKGWDWE VDTENGNYDY

LMYADIDMDH PEVVNELRNW GVWYTNTLGL

DGFRIDAVKH IKYSFTRDWI

NHVRSATGKN MFAVAEFWKN DLGAIENYLN

KTNWNHSVFD VPLHYNLYNA

SKSGGNYDMR QIFNGTVVQR HPMHAVTFVD

NHDSQPEEAL ESFVEEWFKP

LAYALTLTRE QGYPSVFYGD YYGIPTHGVP

AMKSKIDPIL EARQKYAYGR

QNDYLDHHNI IGWTREGNTA HPNSGLATIM

SDGAGGNKWM FVGRNKAGQV

WTDITGNRAG TVTINADGWG NFSVNGGSVS IWVNK

Based on amino acid sequence identity, another postulated maltopentaose/maltohexaose-forming α-amylase is from another *Bacillus* sp., and is herein referred to as AAI10. The mature amino acid sequence of AAI10 α-amylase is shown, below, as SEQ ID NO: 4:

HHDGTNGTIM QYFEWNVPND GQHWNRLHNN

AQNLKNAGIT AIWIPPAWKG

TSQNDVGYGA YDLYDLGEFN QKGTVRTKYG

TKAELERAIR SLKANGIQVY

GDVVMNHKGG ADFTERVQAV EVNPQNRNQE

VSGTYQIEAW TGFNFPGRGN

QHSSFKWRWY HFDGTDWDQS RQLANRIYKF

RGDGKAWDWE VDTENGNYDY

LMYADVDMDH PEVINELNRW GVWYANTLNL

DGFRLDAVKH IKFSFMRDWL

GHVRGQTGKN LFAVAEYWKN DLGALENYLS

KTNWTMSAFD VPLHYNLYQA

SNSSGNYDMR NLLNGTLVQR HPSHAVTFVD

NHDTQPGEAL ESFVQGWFKP

LAYATILTRE QGYPQVFYGD YYGIPSDGVP

SYRQQIDPLL KARQQYAYGR

QHDYFDHWDV IGWTREGNAS HPNSGLATIM

SDGPGGSKWM YVGRQKAGEV

WHDMTGNRSG TVTINQDGWG HFFVNGGSVS VWVKR

An alignment of these four α-amylases is shown in FIGS. 1A and 1B. Amino acid sequence identity is summarized in Table 1. AA707, AA560 and AAI10 all have greater than 80% amino acid to AA2560.

TABLE 1

| Amino acid sequence identity of α-amylase | | | | |
|---|---|---|---|---|
| | AA2560 | AA707 | AA560 | AAI10 |
| AA2560 | — | 90.3 | 89.5 | 81.7 |
| AA707 | 90.3 | — | 95.5 | 79.8 |
| AA560 | 89.5 | 95.5 | — | 78.6 |
| AAI10 | 81.7 | 79.8 | 78.6 | — |

A variant of AA2560 α-amylase described in WO2021/080948 that demonstrated excellent cleaning performance is shown, below, as SEQ ID NO: 5:

HHNGTNGTMM QYFEWHLPND GQHWNRLRND

AANLKNLGIN AVWIPPAWKG

TSQNDVGYGA YDLYDLGEFN QKGTIRTKYG

TRSQLQSAIA RLQNNGIQVF

GDVVMNHKGG ADGTERVQAV EVNPSNRNQE

VTGEYTIEAW TKFDFPGRGN

THSSFKWRWY HFDGTDWDQS RNLNNRIYKF

TGKAWDWEVD TENGNYDYLM

YADVDMDHPE VINELRRWGV WYTNTLNLDG

FRIDAVKHIK YQFTRDWLNH

VRSTTGKNNM FAVAEFWKND LGAIENYLSK

TNWNHSVFDV PLHYNLYNAS

KSGGNYDMRQ ILNGTVVSKH PIHAVTFVDN

HDSQPAEALE SFVEAWFKPL

AYALILTREQ GYPSVFYGDY YGIPTHGVAA

MKGKIDPILE ARQKYAYGTQ

HDYLDHHNII GWTREGNSAH PNSGLATIMS

DGPGGSKWMY VGRHKAGQVW

RDITGNRTGT VTINADGWGN FSVNGGSVSI WVNK

The variant has the mutations T40N, S91R, Y100F, W116R, Q172N, ΔR181, ΔG182, S244Q and H281S with respect to AA2560 α-amylase, using wild-type AA2560 α-amylase (SEQ ID NO: 1) for numbering.

Using the foregoing variant AA2560 α-amylase as a starting point, additional variant AA2560 α-amylases were designed that demonstrated further improved cleaning performance. Most of the new variants include two mutations, T51V and S125R. Mutations at these positions lead to the loss of hydroxyl groups within the starch binding groove of the molecule. In a structural model of the enzyme, the hydroxyl groups of T51 and S125 are solvent exposed and available for hydrogen bonding within the starch binding groove (FIGS. 1A and 1B).

Without being limited to a theory, we propose that the combination of T51V and S125R mutations may together serve to reduce non-productive binding modes of the starch in the active site by removing hydroxyl groups that would otherwise be exposed for hydrogen bonding in the starch-binding groove. The loss of these hydroxyl groups may prevent the binding of starch in conformations that are incompatible with the optimal positioning of the molecule with respect to the nucleophile and general acid/base side chains for catalysis. Based on this theory, other substitutions that remove the hydroxyl groups at these positions are likely to provide similar cleaning advantages, thus the substitutions can more generally be described as T51X and S125X, where X is not S or T.

Another feature of the present variants continues to be a mutation at position 91 and/or at least one mutation at the bottom (base) of the α-amylase TIM barrel structure. The barrel bottom residues have solvent accessible surface area greater than zero and lie in or adjacent to the core β-barrel structure, at the side of the barrel opposite of the active site, and at the side containing the N-terminal ends of each strand. Relevant residues are at positions 6, 7, 40, 96, 98, 100, 229, 230, 231, 262, 263, 285, 286, 287, 288, 322, 323, 324, 325, 362, 363 and 364, referring to SEQ ID NO: 1 for numbering. In all cases, the residues line the base of the TIM barrel structure, which represents a primary architechtural feature of α-amylases and many other enzymes. An exemplary mutation at residue 91 is the substitution from a polar residue to a charged residue, particularly a positively-charged residue, such as arginine (i.e., X91R), which in the case of AA2560 is the specific substitution S91R.

The variants may additionally feature mutations in the loop that includes surface-exposed residues 167, 169, 171, 172 and 176, referring to SEQ ID NO: 1 for numbering. The variants may additionally feature mutations at positions 116 and 281, which are believed to affect solubility.

The variants may additionally feature stabilizing mutations at positions 190 and/or 244, referring to SEQ ID NO: 1 for numbering. Such mutations have been well categorized, and are included in current, commercially-available α-amylases used for cleaning. Exemplary mutations in these residues are the substitutions X190P and X244A, E or Q, specifically E190P, S244A, S244E and S244Q. Mutations at positions 275 and 279 are also of interest in combination with mutations at position 190.

The variants may additionally feature mutations at positions 1, 7, 118, 195, 202, 206, 321, 245 and 459, referring to SEQ ID NO: 1 for numbering, which are included in current, commercially-available α-amylases or proposed for such applications.

The variants further include a deletion in the $X_1G/S_1X_2G_2$ motif adjacent to the calcium-binding loop corresponding to R181, G182, T183, and G184, using SEQ ID NO: 1 for numbering. In some embodiments, the variant α-amylases include adjacent, pair-wise deletions of amino acid residues corresponding to R181 and G182, or T183 and G184. A deletion in amino acid residues corresponding to R181 and G182 may be referred to as "ΔRG," while a deletion in amino acid residues corresponding to the residue at position 183 (usually T, D, or H) and G184 may be referred to as "ΔTG," "ΔDG," "ΔHG" etc., as appropriate. Both pair-wise deletions appear to produce the same effect in α-amylases.

The variants may further include previously described mutations for use in other α-amylases having a similar fold and/or having 60% or greater amino acid sequence identity to (i) any of the well-known *Bacillus* α-amylases, e.g., from *B. lichenifomis* (i.e., BLA and LAT), *B. stearothermophilus* (i.e., BSG), and *B. amyloliquifaciens* (i.e., P00692, BACAM, and BAA), or hybrids, thereof, (ii) any α-amylases catagorized as Carbohydrate-Active Enzymes database (CAZy) Family 13 α-amylases or (iii) any amylase that has heretofore been referred to by the descriptive term, "Termamyl-like." Exemplary α-amylases include but are not limited to those from *Bacillus* sp. SG-1, *Bacillus* sp. 707, and α-amylases referred to as A7-7, SP722, DSM90 14 and KSM AP1378. Similarly, any of the combination of mutations described, herein, may produce performance advantages in these α-amylases, regardless of whether they have been described as maltopentaose/maltohexaose-producing α-amylases.

Specifically contemplated combinatorial variants are listed below, with respect to SEQ ID NO: 5 and using SEQ ID NO: 5 for numbering. Note that the variant of SEQ ID NO: 5 already has the deletions ΔR181 and ΔG182, therefore the number of every position after 183 is reduced by two.

It will be appreciated that where an α-amylase naturally has a mutation listed above (i.e., where the wild-type α-amylase already comprised a residue identified as a mutation), then that particular mutation does not apply to that molecule. However, other described mutations may work in combination with the naturally-occuring residue at that position.

The present variant α-amylases may also include the substitution, deletion or addition of one or several amino acids in the amino acid sequence, for example less than 10, less than 9, less than 8, less than 7, less than 6, less than 5, less than 4, less than 3, or even less than 2 substitutions, deletions or additions. Such variants are expected to have similar activity to the α-amylases from which they were derived. The present variant α-amylases may also include minor deletions and/or extensions of one or a few residues at their N or C-termini. Such minor changes are unlikely to defeat the inventive concepts described herein.

The present amylase may be "precursor," "immature," or "full-length," in which case they include a signal sequence, or "mature," in which case they lack a signal sequence. Mature forms of the polypeptides are generally the most useful. Unless otherwise noted, the amino acid residue numbering used herein refers to the mature forms of the respective amylase polypeptides.

In some embodiments, the variant α-amylase has at least 95%, at least 96%, at least 97%, at least 98%, or even at least 99%, but less than 100%, amino acid sequence identity to SEQ ID NO: 1, 2, 3, 4 or 5, preferably SEQ ID NO 5.

2.5. Nucleotides Encoding Variant Amylase Polypeptides

In another aspect, nucleic acids encoding a variant α-amylase polypeptide are provided. The nucleic acid may encode a particular amylase polypeptide, or an α-amylase having a specified degree of amino acid sequence identity to the particular α-amylase.

In some embodiments, the nucleic acid encodes an α-amylase having at least 90%, at least 91%, at least 92%, at least 93%, at least 94%, at least 95%, at least 96%, at least 97%, at least 98%, or even at least 99%, but less than 100%, amino acid sequence identity to SEQ ID NO: 1, 2, 3, 4 or 5. It will be appreciated that due to the degeneracy of the genetic code, a plurality of nucleic acids may encode the same polypeptide.

In some embodiments, the nucleic acid hybridizes under stringent or very stringent conditions to a nucleic acid encoding (or complementary to a nucleic acid encoding) an α-amylase having at least 90%, at least 91%, at least 92%, at least 93%, at least 94%, at least 95%, at least 96%, at least 97%, at least 98%, or even at least 99%, but less than 100%, amino acid sequence identity to SEQ ID NO: 1, 2, 3, 4 or 5.

3. Production of Variant α-Amylases

The present variant α-amylases can be produced in host cells, for example, by secretion or intracellular expression, using methods well-known in the art. Fermentation, separation, and concentration techniques are well known in the art and conventional methods can be used to prepare a concentrated, variant-α-amylase-polypeptide-containing solution.

For production scale recovery, variant α-amylase polypeptides can be enriched or partially purified as generally described above by removing cells via flocculation with polymers. Alternatively, the enzyme can be enriched or purified by microfiltration followed by concentration by ultrafiltration using available membranes and equipment. However, for some applications, the enzyme does not need to be enriched or purified, and whole broth culture can be lysed and used without further treatment. The enzyme can then be processed, for example, into granules.

Automatic Dishwashing Composition

The automatic dishwashing composition can be in any physical form. It can be a loose powder, a gel or presented in unit dose form. Preferably it is in unit dose form, unit dose forms include pressed tablets and water-soluble packs. The automatic dishwashing composition is preferably presented in unit-dose form and it can be in any physical form including solid, liquid and gel form. The composition is very well suited to be presented in the form of a multi-compartment pack, more in particular a multi-compartment pack comprising compartments with compositions in different physical forms, for example a compartment comprising a composition in solid form and another compartment comprising a composition in liquid form. The composition is preferably enveloped by a water-soluble film such as polyvinyl alcohol. Especially preferred are compositions in unit dose form wrapped in a polyvinyl alcohol film having a thickness of less than 100 μm, preferably from 20 to 90 μm. The detergent composition weighs from about 8 to about 25 grams, preferably from about 10 to about 20 grams. This weight range fits comfortably in a dishwasher dispenser. Even though this range amounts to a low amount of detergent, the detergent has been formulated in a way that provides all the benefits mentioned herein above.

The composition is preferably phosphate free. By "phosphate-free" is herein understood that the composition comprises less than 1%, preferably less than 0.1% by weight of the composition of phosphate.

Complexing Agent System

For the purpose of this disclosure, a "complexing agent" is a compound capable of binding polyvalent ions such as calcium, magnesium, lead, copper, zinc, cadmium, mercury, manganese, iron, aluminium and other cationic polyvalent ions to form a water-soluble complex. The complexing agent has a logarithmic stability constant ([log K]) for Ca2+ of at least 3. The stability constant, log K, is measured in a solution of ionic strength of 0.1, at a temperature of 25° C.

The composition preferably comprises from 10% to 50% by weight of the composition of a complexing agent system. The complexing agent system comprises one or more complexing agents selected from the group consisting of methyl glycine diacetic acid (MGDA), citric acid, glutamic-N,N-diacetic acid (GLDA), iminodisuccinic acid (IDS), carboxy methyl inulin, L-Aspartic acid N, N-diacetic acid tetrasodium salt (ASDA) and mixtures thereof. Preferably, the complexing agent system comprises at least 10% by weight of the composition of MGDA. The complexing system may additionally comprise a complexing agent selected from the group consisting of citric acid, (GLDA), (IDS), carboxy methyl inulin, L-Aspartic acid N, N-diacetic acid tetrasodium salt (ASDA) and mixtures thereof. Preferably the complexing agent system comprises at least 10% by weight of the composition of MGDA and at least 10% by weight of the composition of citric acid. For the purpose of this disclosure, the term "acid", when referring to complexing agents, includes the acid and salts thereof.

In a preferred embodiment, the composition comprises at least 15%, more preferably from 20% to 40% by weight of the composition of MGDA, more preferably the tri-sodium salt of MGDA. Compositions comprising this high level of MGDA perform well in hard water and also in long and/or hot cycles.

The complexing agent system can further comprise citric acid.

Dispersant Polymer

A dispersant polymer can be used in any suitable amount from about 0.1 to about 20%, preferably from 0.2 to about 15%, more preferably from 0.3 to % by weight of the composition.

The dispersant polymer is capable to suspend calcium or calcium carbonate in an automatic dishwashing process.

The dispersant polymer has a calcium binding capacity within the range between 30 to 250 mg of Ca/g of dispersant polymer, preferably between 35 to 200 mg of Ca/g of dispersant polymer, more preferably 40 to 150 mg of Ca/g of dispersant polymer at 25° C. In order to determine if a polymer is a dispersant polymer within the meaning of the present disclosure, the following calcium binding-capacity determination is conducted in accordance with the following instructions:

Calcium Binding Capacity Test Method

The calcium binding capacity referred to herein is determined via titration using a pH/ion meter, such as the Meettler Toledo SevenMulti™ bench top meter and a PerfectION™ comb Ca combination electrode. To measure the binding capacity a heating and stirring device suitable for beakers or tergotometer pots is set to 25° C., and the ion electrode with meter are calibrated according to the manufacturer's instructions. The standard concentrations for the electrode calibration should bracket the test concentration and should be measured at 25° C. A stock solution of 1000 mg/g of Ca is prepared by adding 3.67 g of $CaCl_2$-$2H_2O$ into 1 L of deionised water, then dilutions are carried out to prepare three working solutions of 100 mL each, respectively comprising 100 mg/g, 10 mg/g, and 1 mg/g concentrations of Calcium. The 100 mg Ca/g working solution is used as the initial concentration during the titration, which is conducted at 25° C. The ionic strength of each working solution is adjusted by adding 2.5 g/L of NaCl to each. The 100 mL of 100 mg Ca/g working solution is heated and stirred until it reaches 25° C. The initial reading of Calcium ion concentration is conducted at when the solution reaches 25° C. using the ion electrode. Then the test polymer is added incrementally to the calcium working solution (at 0.01 g/L intervals) and measured after 5 minutes of agitation following each incremental addition. The titration is stopped when the solution reaches 1 mg/g of Calcium. The titration procedure is repeated using the remaining two calcium concentration working solutions. The binding capacity of the test polymer is calculated as the linear slope of the calcium concentrations measured against the grams/L of test polymer that was added.

The dispersant polymer preferably bears a negative net charge when dissolved in an aqueous solution with a pH greater than 6.

The dispersant polymer can bear also sulfonated carboxylic esters or amides, in order to increase the negative charge at lower pH and improve their dispersing properties in hard water. The preferred dispersant polymers are sulfonated/carboxylated polymers, i.e., polymer comprising both sulfonated and carboxylated monomers.

Preferably, the dispersant polymers are sulfonated derivatives of polycarboxylic acids and may comprise two, three, four or more different monomer units. The preferred copolymers contain:

At least one structural unit derived from a carboxylic acid monomer having the general formula (III):

(III)

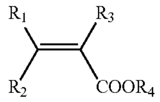

wherein $R_1$ to $R_3$ are independently selected from hydrogen, methyl, linear or branched saturated alkyl groups having from 2 to 12 carbon atoms, linear or branched mono or polyunsaturated alkenyl groups having from 2 to 12 carbon atoms, alkyl or alkenyl groups as aforementioned substituted with —NH2 or —OH, or —COOH, or $COOR_4$, where $R_4$ is selected from hydrogen, alkali metal, or a linear or branched, saturated or unsaturated alkyl or alkenyl group with 2 to 12 carbons;

Preferred carboxylic acid monomers include one or more of the following: acrylic acid, maleic acid, maleic anhydride, itaconic acid, citraconic acid, 2-phenylacrylic acid, cinnamic acid, crotonic acid, fumaric acid, methacrylic acid, 2-ethylacrylic acid, methylenemalonic acid, or sorbic acid. Acrylic and methacrylic acids being more preferred.

Optionally, one or more structural units derived from at least one nonionic monomer having the general formula (IV):

(IV)

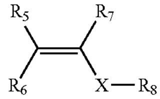

wherein $R_5$ to $R_7$ are independently selected from hydrogen, methyl, phenyl or hydroxyalkyl groups containing 1 to 6 carbon atoms, and can be part of a cyclic structure, X is an optionally present spacer group which is selected from —$CH_2$—, —COO—, —CONH— or —$CONR_8$—, and $R_8$ is selected from linear or branched, saturated alkyl radicals having 1 to 22 carbon atoms or unsaturated, preferably aromatic, radicals having from 6 to 22 carbon atoms.

Preferred non-ionic monomers include one or more of the following: butene, isobutene, pentene, 2-methylpent-1-ene, 3-methylpent-1-ene, 2,4,4-trimethylpent-1-ene, 2,4,4-trimethylpent-2-ene, cyclopentene, methylcyclopentene, 2-methyl-3-methyl-cyclopentene, hexene, 2,3-dimethylhex-1-ene, 2,4-dimethylhex-1-ene, 2,5-dimethylhex-1-ene, 3,5-dimethylhex-1-ene, 4,4-dimethylhex-1-ene, cyclohexene, methylcyclohexene, cycloheptene, alpha olefins having 10 or more carbon atoms such as, dec-1-ene, dodec-1-ene, hexadec-1-ene, octadec-1-ene and docos-1-ene, preferred aromatic monomers are styrene, alpha methylstyrene, 3-methylstyrene, 4-dodecylstyrene, 2-ethyl-4-bezylstyrene, 4-cyclohexylstyrene, 4-propylstyrol, 1-vinylnaphtalene, 2-vinylnaphtalene; preferred carboxylic ester monomers are methyl (meth)acrylate, ethyl (meth)acrylate, propyl (meth) acrylate, t-butyl (meth)acrylate, pentyl (meth)acrylate, hexyl (meth)acrylate, 2-ethylhexyl (meth)acrylate, octyl (meth) acrylate, lauryl (meth)acrylate, stearyl (meth)acrylate and behenyl (meth)acrylate; preferred amides are N-methyl acrylamide, N-ethyl acrylamide, N-t-butyl acrylamide, N-2-ethylhexyl acrylamide, N-octyl acrylamide, N-lauryl acrylamide, N-stearyl acrylamide, N-behenyl acrylamide.

And at least one structural unit derived from at least one sulfonic acid monomer having the general formula (V) and (VI):

(V)

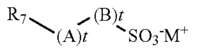

(VI)

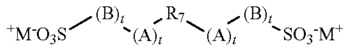

wherein $R_7$ is a group comprising at least one sp2 bond, A is O, N, P, S, an amido or ester linkage, B is a mono- or polycyclic aromatic group or an aliphatic group, each t is independently 0 or 1, and M+ is a cation. In one aspect, $R_7$ is a C2 to C6 alkene. In another aspect, R7 is ethene, butene or propene.

Preferred sulfonated monomers include one or more of the following: 1-acrylamido-1-propanesulfonic acid, 2-acrylamido-2-propanesulfonic acid, 2-acrylamido-2-methyl-1-propanesulfonic acid, 2-methacrylamido-2-methyl-1-propanesulfonic acid, 3- methacrylamido-2-hydroxy-propanesulfonic acid, allylsulfonic acid, methallylsulfonic acid, allyloxybenzenesulfonic acid, methallyloxybenzenesulfonic acid, 2-hydroxy-3-(2-propenyloxy) propanesulfonic acid, 2-methyl-2-propen-1-sulfonic acid, styrenesulfonic acid, vinylsulfonic acid, 3-sulfopropyl, 3-sulfo-propylmethacrylate, sulfomethacrylamide, sulfomethylmethacrylamide and mixtures of said acids or their water-soluble salts.

Preferably, the polymer comprises the following levels of monomers: from about 40 to about 90%, preferably from about 60 to about 90% by weight of the polymer of one or more carboxylic acid monomer; from about 5 to about 50%, preferably from about 10 to about 40% by weight of the polymer of one or more sulfonic acid monomer; and optionally from about 1% to about 30%, preferably from about 2 to about 20% by weight of the polymer of one or more non-ionic monomer. An especially preferred polymer comprises about 70% to about 80% by weight of the polymer of at least one carboxylic acid monomer and from about 20% to about 30% by weight of the polymer of at least one sulfonic acid monomer.

In the polymers, all or some of the carboxylic or sulfonic acid groups can be present in neutralized form, i.e. the acidic hydrogen atom of the carboxylic and/or sulfonic acid group in some or all acid groups can be replaced with metal ions, preferably alkali metal ions and in particular with sodium ions.

The carboxylic acid is preferably (meth)acrylic acid. The sulfonic acid monomer is preferably 2-acrylamido-2-propanesulfonic acid (AMPS).

Preferred commercial available polymers include: Alcosperse 240, Aquatreat AR 540 and Aquatreat MPS supplied by Alco Chemical; Acumer 3100, Acumer 2000, Acusol 587G and Acusol 588G supplied by Rohm & Haas; Goodrich K-798, K-775 and K-797 supplied by BF Goodrich; and ACP 1042 supplied by ISP technologies Inc. Particularly preferred polymers are Acusol 587G and Acusol 588G supplied by Rohm & Haas.

Suitable dispersant polymers include anionic carboxylic polymer of low molecular weight. They can be homopolymers or copolymers with a weight average molecular weight of less than or equal to about 200,000 g/mol, or less than or equal to about 75,000 g/mol, or less than or equal to about 50,000 g/mol, or from about 3,000 to about 50,000 g/mol, preferably from about 5,000 to about 45,000 g/mol. The dispersant polymer may be a low molecular weight homopolymer of polyacrylate, with an average molecular weight of from 1,000 to 20,000, particularly from 2,000 to 10,000, and particularly preferably from 3,000 to 5,000.

The dispersant polymer may be a copolymer of acrylic with methacrylic acid, acrylic and/or methacrylic with maleic acid, and acrylic and/or methacrylic with fumaric acid, with a molecular weight of less than 70,000. Their molecular weight ranges from 2,000 to 80,000 and more preferably from 20,000 to 50,000 and in particular 30,000 to 40,000 g/mol. and a ratio of (meth)acrylate to maleate or fumarate segments of from 30:1 to 1:2.

The dispersant polymer may be a copolymer of acrylamide and acrylate having a molecular weight of from 3,000 to 100,000, alternatively from 4,000 to 20,000, and an acrylamide content of less than 50%, alternatively less than 20%, by weight of the dispersant polymer can also be used. Alternatively, such dispersant polymer may have a molecular weight of from 4,000 to 20,000 and an acrylamide content of from 0% to 15%, by weight of the polymer.

Dispersant polymers suitable herein also include itaconic acid homopolymers and copolymers.

Alternatively, the dispersant polymer can be selected from the group consisting of alkoxylated polyalkyleneimines, alkoxylated polycarboxylates, polyethylene glycols, styrene co-polymers, cellulose sulfate esters, carboxylated polysaccharides, amphiphilic graft copolymers and mixtures thereof.

Bleaching System

The composition preferably comprises a bleaching system comprising a high level of bleach, preferably percarbonate in combination with a bleach activator or a bleach catalyst or both. Preferably the bleach activator is TAED and the bleach catalyst is a manganese bleach catalyst.

Bleach

The composition preferably comprises from about 10 to about 20%, more preferably from about 12 to about 18% of bleach, preferably percarbonate, by weight of the composition.

Inorganic and organic bleaches are suitable for use herein. Inorganic bleaches include perhydrate salts such as perborate, percarbonate, perphosphate, persulfate and persilicate salts. The inorganic perhydrate salts are normally the alkali metal salts. The inorganic perhydrate salt may be included as the crystalline solid without additional protection. Alternatively, the salt can be coated. Suitable coatings include sodium sulphate, sodium carbonate, sodium silicate and mixtures thereof. Said coatings can be applied as a mixture applied to the surface or sequentially in layers.

Alkali metal percarbonates, particularly sodium percarbonate is the preferred bleach for use herein. The percarbonate is most preferably incorporated into the products in a coated form which provides in-product stability.

Potassium peroxymonopersulfate is another inorganic perhydrate salt of utility herein. Typical organic bleaches are organic peroxyacids, especially dodecanediperoxoic acid, tetradecanediperoxoic acid, and hexadecanediperoxoic acid. Mono- and diperazelaic acid, mono- and diperbrassylic acid are also suitable herein. Diacyl and Tetraacylperoxides, for instance dibenzoyl peroxide and dilauroyl peroxide, are other organic peroxides that can be used in the context of this disclosure.

Further typical organic bleaches include the peroxyacids, particular examples being the alkylperoxy acids and the arylperoxy acids. Preferred representatives are (a) peroxybenzoic acid and its ring-substituted derivatives, such as alkylperoxybenzoic acids, but also peroxy-α-naphthoic acid and magnesium monoperphthalate, (b) the aliphatic or substituted aliphatic peroxy acids, such as peroxylauric acid, peroxystearic acid, ε-phthalimidoperoxycaproic acid[phthaloiminoperoxyhexanoic acid (PAP)], o-carboxybenzamidoperoxycaproic acid, N-nonenylamidoperadipic acid and N-nonenylamidopersuccinates, and (c) aliphatic and araliphatic peroxydicarboxylic acids, such as 1,12-diperoxycarboxylic acid, 1,9-diperoxyazelaic acid, diperoxysebacic acid, diperoxybrassylic acid, the diperoxyphthalic acids, 2-decyldiperoxybutane-1,4-dioic acid, N,N-terephthaloyldi (6-aminopercaproic acid).

Bleach Activators

Bleach activators are typically organic peracid precursors that enhance the bleaching action in the course of cleaning at temperatures of 60° C. and below. Bleach activators suitable for use herein include compounds which, under perhydrolysis conditions, give aliphatic peroxoycarboxylic acids having preferably from 1 to 12 carbon atoms, in particular from 2 to 10 carbon atoms, and/or optionally substituted perbenzoic acid. Suitable substances bear O-acyl and/or N-acyl groups of the number of carbon atoms specified and/or optionally substituted benzoyl groups. Preference is given to polyacylated alkylenediamines, in particular tetraacetylethylenediamine (TAED), acylated triazine derivatives, in particular 1,5-diacetyl-2,4-dioxohexahydro-1,3,5-triazine (DADHT), acylated glycolurils, in particular tetraacetylglycoluril (TAGU), N-acylimides, in particular N-nonanoylsuccinimide (NOSI), acylated phenolsulfonates, in particular n-nonanoyl- or isononanoyloxybenzenesulfonate (n- or iso-NOBS), decanoyloxybenzoic acid (DOBA), carboxylic anhydrides, in particular phthalic anhydride, acylated polyhydric alcohols, in particular triacetin, ethylene glycol diacetate and 2,5-diacetoxy-2,5-dihydrofuran and also triethylacetyl citrate (TEAC). The composition may comprise from 0.01 to 5, preferably from 0.2 to 2% by weight of the composition of bleach activator, preferably TAED.

Bleach Catalyst

The composition herein preferably contains a bleach catalyst, preferably a metal containing bleach catalyst. More preferably the metal containing bleach catalyst is a transition metal containing bleach catalyst, especially a manganese or cobalt-containing bleach catalyst.

Bleach catalysts preferred for use herein include manganese triazacyclononane and related complexes; Co, Cu, Mn and Fe bispyridylamine and related complexes; and pentamine acetate cobalt (III) and related complexes. Especially preferred bleach catalyst for use herein are 1,4,7-trimethyl-1,4,7-triazacyclononane (Me-TACN) and 1,2, 4,7- tetramethyl-1,4,7-triazacyclononane (Me/Me-TACN). Especially preferred composition for use herein comprises 1,4,7-trimethyl-1,4,7-triazacyclononane (Me-TACN) and/or 1,2,4,7-tetramethyl-1,4,7-triazacyclononane (Me/Me-TACN).

Preferably the composition comprises from 0.001 to 0.5, more preferably from 0.002 to 0.1%, more preferably from 0.005 to 0.075% of bleach catalyst by weight of the composition. Preferably the bleach catalyst is a manganese bleach catalyst.

Inorganic Builder

The composition preferably comprises an inorganic builder. Suitable inorganic builders are selected from the group consisting of carbonate, silicate and mixtures thereof. Especially preferred for use herein is sodium carbonate. Preferably the composition comprises from 5 to 60%, more preferably from 10 to 50% and especially from 15 to 45% of sodium carbonate by weight of the composition.

Surfactant

Surfactants suitable for use herein include non-ionic surfactants, preferably the compositions are free of any other surfactants. Traditionally, non-ionic surfactants have been used in automatic dishwashing for surface modification purposes in particular for sheeting to avoid filming and spotting and to improve shine. It has been found that non-ionic surfactants can also contribute to prevent redeposition of soils.

Preferably the composition comprises a non-ionic surfactant or a non-ionic surfactant system, more preferably the non-ionic surfactant or a non-ionic surfactant system has a phase inversion temperature, as measured at a concentration of 1% in distilled water, between 40 and 70° C., preferably between 45 and 65° C. By a "non-ionic surfactant system" is meant herein a mixture of two or more non-ionic surfactants. Preferred for use herein are non-ionic surfactant systems. They seem to have improved cleaning and finishing properties and better stability in product than single non-ionic surfactants.

Phase inversion temperature is the temperature below which a surfactant, or a mixture thereof, partitions preferentially into the water phase as oil-swollen micelles and above which it partitions preferentially into the oil phase as water swollen inverted micelles. Phase inversion temperature can be determined visually by identifying at which temperature cloudiness occurs.

The phase inversion temperature of a non-ionic surfactant or system can be determined as follows: a solution containing 1% of the corresponding surfactant or mixture by weight of the solution in distilled water is prepared. The solution is stirred gently before phase inversion temperature analysis to ensure that the process occurs in chemical equilibrium. The phase inversion temperature is taken in a thermostable bath by immersing the solutions in 75 mm sealed glass test tube. To ensure the absence of leakage, the test tube is weighed before and after phase inversion temperature measurement. The temperature is gradually increased at a rate of less than 1° C. per minute, until the temperature reaches a few degrees below the pre-estimated phase inversion temperature. Phase inversion temperature is determined visually at the first sign of turbidity.

Suitable nonionic surfactants include: i) ethoxylated non-ionic surfactants prepared by the reaction of a monohydroxy alkanol or alkyphenol with 6 to 20 carbon atoms with preferably at least 12 moles particularly preferred at least 16 moles, and still more preferred at least 20 moles of ethylene oxide per mole of alcohol or alkylphenol; ii) alcohol alkoxylated surfactants having a from 6 to 20 carbon atoms and at least one ethoxy and propoxy group. Preferred for use herein are mixtures of surfactants i) and ii).

Other suitable non-ionic surfactants are epoxy-capped poly (oxyalkylated) alcohols represented by the formula:

R1O[CH2CH(CH3)O]x[CH2CH2O]y[CH2CH(OH)R2] (I)

wherein R1 is a linear or branched, aliphatic hydrocarbon radical having from 4 to 18 carbon atoms; R2 is a linear or branched aliphatic hydrocarbon radical having from 2 to 26 carbon atoms; x is an integer having an average value of from 0.5 to 1.5, more preferably about 1; and y is an integer having a value of at least 15, more preferably at least 20.

Preferably, the surfactant of formula I, at least about 10 carbon atoms in the terminal epoxide unit [CH2CH(OH)R2]. Suitable surfactants of formula I, according to the present disclosure, are Olin Corporation's POLY-TERGENT® SLF-18B nonionic surfactants, as described, for example, in WO 94/22800, published Oct. 13, 1994 by Olin Corporation.

Enzymes

Proteases

The composition can comprise a protease in addition to the amylase of the present disclosure. A mixture of two or more enzymes can contribute to an enhanced cleaning across a broader temperature, cycle duration, and/or substrate range, and provide superior shine benefits, especially when used in conjunction with an anti-redeposition agent and/or a sulfonated polymer.

A suitable protease is a variant subtilisin protease from *Bacillus gibsonii* having the amino acid substitutions X39E, X99R, X126A, X127E and X128G.

Another suitable protease is a subtilisin variant comprising three, four, or five amino acid substitutions selected from the group consisting of S039E, S099R, S126A, D127E, and F128G and further comprises one or more additional substitutions selected from the group consisting of N74D, T114L, M122L, N198A, N198G, M211E, M211Q, N212Q, and N242D, and wherein the variant has at least 80% identity to the amino acid sequence of SEQ ID NO: 6.

Another suitable protease is a subtilisin variant comprising:

(i) two, or more amino acid substitutions selected from the group consisting of S039E, N74D, S099R, M211E, N242D; and (ii) one or more additional substitutions selected from the group consisting of T114L, M122L, S126A, F128G, N198A, N198G, M211Q, N212Q, and wherein the variant has at least 80% identity to the amino acid sequence of SEQ ID NO: 6 or 7.

Suitable proteases for use in combination with the amylase of the present disclosure include metalloproteases and serine proteases, including neutral or alkaline microbial serine proteases, such as subtilisins (EC 3.4.21.62). Suitable proteases include those of animal, vegetable or microbial origin. In one aspect, such suitable protease may be of microbial origin. The suitable proteases include chemically or genetically modified mutants of the aforementioned suitable proteases. In one aspect, the suitable protease may be a serine protease, such as an alkaline microbial protease or/and a trypsin-type protease. Examples of suitable neutral or alkaline proteases include:

(a) subtilisins (EC 3.4.21.62), especially those derived from *Bacillus*, such as *Bacillus* sp., *B. lentus, B. alkalophilus, B. subtilis, B. amyloliquefaciens, B. pumilus* , *B. gibsonii*, and *B. akibaii* described in WO2004067737, WO2015091989, WO2015091990, WO2015024739, WO2015143360, U.S. Pat. Nos. 6,312,936 B1, 5,679,630, 4,760,025, WO03/055974, WO03/054185, WO03/054184, WO2017/215925, DE102006022216A1, WO2015089447, WO2015089441, WO2016066756, WO2016066757, WO2016069557, WO2016069563, WO2016069569, WO2016174234, WO2017/089093, WO2020/156419, WO2016/183509. Specifically, mutations S9R, A15T, V66A, A188P, V199I, N212D, Q239R, N255D, X9E, X200L, X256E, X9R, X19L, X60D (Savinase numbering system); subtilisins from *B. pumilus* such as the ones described in DE102006022224A1, WO2020/221578, WO2020/221579, WO2020/221580, including variants comprising amino acid substitutions in at least one or more of the positions selected from 9, 130, 133, 144, 224, 252, 271 (BPN' numbering system).

(b) trypsin-type or chymotrypsin-type proteases, such as trypsin (e.g., of porcine or bovine origin), including the Fusarium protease described in WO 89/06270 and the chymotrypsin proteases derived from *Cellumonas* described in WO 05/052161 and WO 05/052146.

(c) metalloproteases, especially those derived from *Bacillus amyloliquefaciens* decribed in WO07/044993A2; from *Bacillus, Brevibacillus, Thermoactinomyces, Geobacillus, Paenibacillus, Lysinibacillus* or *Streptomyces* spp. Described in WO2014194032, WO2014194054 and WO2014194117; from *Kribella alluminosa* described in WO2015193488; and from *Streptomyces* and *Lysobacter* described in WO2016075078.

(d) protease having at least 90% identity to the subtilase from *Bacillus* sp. TY145, NCIMB 40339, described in WO92/17577 (Novozymes A/S), including the variants of this *Bacillus* sp TY145 subtilase described in WO2015024739, and WO2016066757.

Especially preferred additional proteases for the composition are variants of a parent protease wherein the parent protease demonstrates at least 90%, preferably at least 95%, more preferably at least 98%, even more preferably at least 99% and especially 100% identity with SEQ ID NO:7, and the variant comprises substitutions in one or more, or two or more or three or more of the following positions versus SEQ ID NO:7:

S3V, S9R, A13V, A15T, G20*, L21F, I35V, N60D, V66A, N74D, S85N/R, S97SE, S97AD, S97D/G, S99G/M/D/E, S101A, V102E/I, G116V/R, S126F/L, P127Q, S128A, S154D, G157S, Y161A, R164S, A188P, V199I, Q200C/E/I/K/T/V/W/L, Y203W, N212D, M216S/F, A222V, Q239R/F, T249R, N255D and L256E/N/Q/D Preferred proteases include those with at least 90%, preferably at least 95% identity to SEQ ID NO:7 comprising the following mutations:

S9R+A13V+A15T+135V+N60D+Q239F; or
S9R+A15T+G20*+L21F+N60D+Q239N; or
S9R+A15T+V66A+S97G+A222V+Q239R+N255D; or
S9R+A15T+V66A+N74D+Q239R; or
S9R+A15T+V66A+N212D+Q239R; or
S99SE; or
S99AD; or
N74D+S85R+G116R+S126L+P127Q+S128A; or
N74D+S85R+G116R+S126L+P127Q+S128A+S182D+V238R; or
G116V+S126L+P127Q+S128A; or
S99M+G116V+S126L+P127Q+S128A.

Other suitable proteases are selected from the group consisting of:

(a) a protease having at least 80% sequence identity to the sequence of SEQ ID NO: 6 and comprising three or more substitutions selected from: A37T, S39E, I43V, A47V, P54T, T56Y, I80V, N85S, E87D, S99R, T114Q, M122L, S126A, D127E, F128G, N198A, M211Q, N212Q and N242D, wherein the numbering is according to SEQ ID NO:6;

(b) a protease having at least 80% sequence identity to the sequence of SEQ ID NO: 8 and comprising one or more substitutions selected from: Q12L, I21V, I43V, M122L, D127P, N154S, T156A, G160S, N177V, M211N, M211S, M211L, P212D, P212H, A222S, V228I and T247N, wherein the numbering is according to SEQ ID NO:8; and (c) a protease having at least 80% sequence identity to the sequence of SEQ ID 9 and comprising three or more substitutions selected from: S9R, A15T, G59E, V66A, H118N, A188P, V199I, Q200E, N212D, Q239R, N255D, wherein the numbering is according to SEQ ID NO:9.

Suitable commercially available additional protease enzymes include those sold under the trade names Alcalase®, Savinase®, Primase®, Durazym®, Polarzyme®, Kannase®, Liquanase®, Liquanase Ultra®, Savinase Ultra®, Liquanase® Evity®, Savinase® Evity®, Ovozyme®, Neutrase®, Everlase®, Coronase®, Blaze®, Blaze Ultra®, Blaze® Evity®, Blaze® Exceed, Blaze® Pro, Esperase®, Progress® Uno, Progress® Excel, Progress® Key, Ronozyme®, Vinzon® and Het Ultra® by Novozymes A/S (Denmark);

those sold under the tradename Maxatase®, Maxacal®, Maxapem®, Properase®, Purafect®, Purafect Prime®, Purafect Ox®, FN3®, FN4®, Excellase®, Ultimase® and Purafect OXP® by Dupont; those sold under the tradename Opticlean® and Optimase® by Solvay Enzymes; and those available from Henkel/Kemira, namely BLAP (sequence shown in Figure29 of U.S. Pat. No. 5,352,604 with the following mutations S99D+S101R+S103A+V104I+G159S, hereinafter referred to as BLAP), BLAP R (BLAP with S3T+V4I+V199M+V205I+L217D), BLAP X (BLAP with S3T+V4I+V205I) and BLAP F49 (BLAP with S3T+V4I+A194P+V199M+V205I+L217D); and can optionally comprise at least one further mutation 101E/D, S156D, L262; KAP (*Bacillus alkalophilus* subtilisin with mutations A230V+S256G+S259N) from Kao and Lavergy®, Lavergy® Pro, Lavergy® C Bright from BASF Especially preferred for use herein in combination with the variant protease of the present disclosure are commercial proteases selected from the group consisting of Properase®, Blaze®, Ultimase®, Everlase, Savinase®, Savinase Evity®, Savinase Ultra®, Excellase®, Ovozyme®, Coronase®, Blaze Ultra®, Blaze Evity® and Blaze Pro®, BLAP and BLAP variants.

Preferred levels of protease in the product of the present disclosure include from about 0.05 to about 10, more preferably from about 0.5 to about 7 and especially from about 1 to about 6 mg of active protease/g of composition.

Other Amylases

Preferably the composition may comprise other amylases. Suitable alpha-amylases include those of bacterial or fungal origin. Chemically or genetically modified mutants (variants) are included. A preferred alkaline alpha-amylase is derived from a strain of *Bacillus*, such as *Bacillus licheniformis, Bacillus amyloliquefaciens, Bacillus stearothermophilus, Bacillus subtilis*, or other *Bacillus* sp., such as *Bacillus* sp. NCBI 12289, NCBI 12512, NCBI 12513, DSM 9375 (U.S. Pat. No. 7,153,818) DSM 12368, DSMZ no. 12649, KSM AP1378 (WO 97/00324), KSM K36 or KSM K38 (EP 1,022,334). Preferred amylases include:

Other amylases include:

(a) variants described in WO 96/23873, WO00/60060, WO06/002643 and WO2017/192657, especially the variants with one or more substitutions in the following positions versus the AA560 enzyme listed as SEQ ID NO. 12 in WO06/002643:

26, 30, 33, 82, 37, 106, 118, 128, 133, 149, 150, 160, 178, 182, 186, 193, 202, 214, 231, 246, 256, 257, 258, 269, 270, 272, 283, 295, 296, 298, 299, 303, 304, 305, 311, 314, 315, 318, 319, 339, 345, 361, 378, 383, 419, 421, 437, 441, 444, 445, 446, 447, 450, 461, 471, 482, 484, preferably that also contain the deletions of D183* and G184*.

(b) variants exhibiting at least 90% identity with SEQ ID No. 4 in WO06/002643, the wild-type enzyme from *Bacillus* SP722, especially variants with deletions in the 183 and 184 positions and variants described in WO2000/60060, WO2011/100410 and WO2013/003659which are incorporated herein by reference.

(c) variants exhibiting at least 95% identity with the wild-type enzyme from *Bacillus* sp.707 (SEQ ID NO:7 in U.S. Pat. No. 6,093,562), especially those comprising one or more of the following mutations M202, M208, S255, R172, and/or M261. Preferably said amylase comprises one or more of M202L, M202V, M202S, M202T, M202I, M202Q, M202W, S255N and/or R172Q. Particularly preferred are those comprising the M202L or M202T mutations.

(d) variants described in WO 09/149130, preferably those exhibiting at least 90% identity with SEQ ID NO: 1 or SEQ ID NO:2 in WO 09/149130, the wild-type enzyme from Geobacillus Stearophermophilus or a truncated version thereof.

(e) variants exhibiting at least 89% identity with SEQ ID NO:1 in WO2016091688, especially those comprising deletions at positions H183+G184 and additionally one or more mutations at positions 405, 421, 422 and/or 428.

(f) variants exhibiting at least 60% amino acid sequence identity with the "PcuAmyl α-amylase" from *Paenibacillus curdlanolyticus* YK9 (SEQ ID NO:3 in WO2014099523).

(g) variants exhibiting at least 60% amino acid sequence identity with the "CspAmy2 amylase" from *Cytophaga* sp. (SEQ ID NO:1 in WO2014164777).

(h) variants exhibiting at least 85% identity with AmyE from *Bacillus subtilis* (SEQ ID NO:1 in WO2009149271).

(i) variants exhibiting at least 90% identity with the wild-type amylase from *Bacillus* sp. KSM-K38 with accession number AB051102.

(j) variants exhibiting at least 90%, preferably at least 95%, preferably at least 98% identity with the mature amino acid sequence of AAI10 from *Bacillus* sp (SEQ ID NO:7 in WO2016180748).

(k) variants exhibiting at least 80% identity with the mature amino acid sequence of *Alicyclobacillus* sp. amylase (SEQ ID NO:8 in WO2016180748).

Preferably the amylase is an engineered enzyme, wherein one or more of the amino acids prone to bleach oxidation have been substituted by an amino acid less prone to oxidation. In particular it is preferred that methionine residues are substituted with any other amino acid. In particular it is preferred that the methionine most prone to oxidation is substituted. Preferably the methionine in a position equivalent to 202 in the AA560 enzyme listed as SEQ ID NO. 12 in WO06/002643 is substituted. Preferably, the methionine at this position is substituted with threonine or leucine, preferably leucine.

Suitable commercially available alpha-amylases include DURAMYL®, LIQUEZYME®, TERMAMYL®, TERMAMYL ULTRA®, NATALASE®, SUPRAMYL®, STAINZYME®, STAINZYME PLUS®, FUNGAMYL®, ATLANTIC®, INTENSA® and BAN® (Novozymes A/S, Bagsvaerd, Denmark), KEMZYM® AT 9000 Biozym Biotech Trading GmbH Wehlistrasse 27b A-1200 Wien Austria, RAPIDASE®, PURASTAR®, ENZYSIZE®, OPTISIZE HT PLUS®, POWERASE®, PREFERENZ S® series (including PREFERENZ S1000® and PREFERENZ S2000® and PURASTAR OXAM® (DuPont., Palo Alto, California) and KAM® (Kao, 14-10 Nihonbashi Kayabacho, 1-chome, Chuo-ku Tokyo 103-8210, Japan). In one aspect, suitable amylases include ATLANTIC®, STAINZYME®, POWERASE®, INTENSA® and STAINZYME PLUS® and mixtures thereof.

Preferably, the composition comprises at least 0.01 mg, preferably from about 0.05 to about 10, more preferably from about 0.1 to about 6, especially from about 0.2 to about 5 mg of active amylase/g of composition.

Preferably, the protease and/or amylase of the composition are in the form of granulates, the granulates comprise more than 29% of sodium sulfate by weight of the granulate and/or the sodium sulfate and the active enzyme (protease and/or amylase) are in a weight ratio of between 3:1 and 100:1 or preferably between 4:1 and 30:1 or more preferably between 5:1 and 20:1.

Protease Stabilitizer

Peptide aldehydes may be used as protease stabilizers in detergent formulations as previously described (WO199813458, WO2011036153, US20140228274). Examples of peptide aldehyde stabilizers are peptide aldehydes, ketones, or halomethyl ketones and might be 'N-capped' with for instance a ureido, a carbamate, or a urea moiety, or 'doubly N-capped' with for instance a carbonyl, a ureido, an oxiamide, a thioureido, a dithiooxamide, or a thiooxamide moiety (EP2358857B1). The molar ratio of these inhibitors to the protease may be 0.1:1 to 100:1, e.g. 0.5:1-50:1, 1:1-25:1 or 2:1-10:1. Other examples of protease stabilizers are benzophenone or benzoic acid anilide derivatives, which might contain carboxyl groups (U.S. Pat. No. 7,968,508 B2). The molar ratio of these stabilizers to protease is preferably in the range of 1:1 to 1000:1 in particular 1:1 to 500:1 especially preferably from 1:1 to 100:1, most especially preferably from 1:1 to 20:1.

Crystal Growth Inhibitor

Crystal growth inhibitors are materials that can bind to calcium carbonate crystals and prevent further growth of species such as aragonite and calcite.

Examples of effective crystal growth inhibitors include phosphonates, polyphosphonates, inulin derivatives, polyitaconic acid homopolymers and cyclic polycarboxylates.

Suitable crystal growth inhibitors may be selected from the group comprising HEDP (1-hydroxyethylidene 1,1-diphosphonic acid), carboxymethylinulin (CMI), tricarballylic acid and cyclic carboxylates. For the purposes of this disclosure the term carboxylate covers both the anionic form and the protonated carboxylic acid form.

Cyclic carboxylates contain at least two, preferably three or preferably at least four carboxylate groups and the cyclic structure is based on either a mono- or bi-cyclic alkane or a heterocycle. Suitable cyclic structures include cyclopropane, cyclobutane, cyclohexane or cyclopentane or cycloheptane, bicyclo-heptane or bicyclo-octane and/or tetrhaydrofuran. One preferred crystal growth inhibitor is cyclopentane tetracarboxylate.

Cyclic carboxylates having at least 75%, preferably 100% of the carboxylate groups on the same side, or in the "cis" position of the 3D-structure of the cycle are preferred for use herein.

It is preferred that the two carboxylate groups, which are on the same side of the cycle are in directly neighbouring or "ortho" positions.

Preferred crystal growth inhibitors include HEDP, tricarballylic acid, tetrahydrofurantetracarboxylic acid (THFTCA) and cyclopentanetetracarboxylic acid (CPTCA). The THFTCA is preferably in the 2c,3t,4t,5c-configuration, and the CPTCA in the cis,cis,cis,cis-configuration. Especially preferred crystal growth inhibitor for use herein is HEDP.

Also, preferred for use herein are partially decarboxylated polyitaconic acid homopolymers, preferably having a level of decarboxylation is in the range of 50 mole % to 90 mole %. Especially preferred polymer for use herein is Itaconix TSI® provided by Itaconix.

The crystal growth inhibitors are present preferably in a quantity from about 0.01 to about 10%, particularly from about 0.02 to about 5% and in particular, from 0.05 to 3% by weight of the composition.

Metal Care Agents

Metal care agents may prevent or reduce the tarnishing, corrosion or oxidation of metals, including aluminium, stainless steel and non-ferrous metals, such as silver and copper. Preferably the composition comprises from 0.1 to 5%, more preferably from 0.2 to 4% and especially from 0.3 to 3% by weight of the product of a metal care agent, preferably the metal care agent is benzo triazole (BTA).

Glass Care Agents

Glass care agents protect the appearance of glass items during the dishwashing process. Preferably the composition comprises from 0.1 to 5%, more preferably from 0.2 to 4% and specially from 0.3 to 3% by weight of the composition of a metal care agent, preferably the glass care agent is a zinc containing material, specially hydrozincite. Other suitable glass care agents are polyethyleneimine (PEI). A particularly preferred PEI is Lupasol® FG, supplied by BASF.

pH

The automatic dishwashing composition preferably has a pH as measured in 1% weight/volume aqueous solution in distilled water at 20° C. of from about 9 to about 12, more preferably from about 10 to less than about 11.5 and especially from about 10.5 to about 11.5.

Reserve Alkalinity

The automatic dishwashing composition preferably has a reserve alkalinity of from about 10 to about 20, more preferably from about 12 to about 18 at a pH of 9.5 as measured in NaOH with 100 grams of product at 20° C.

Wash Conditions

There are a variety of wash conditions including varying detergent formulations, wash water volumes, wash water temperatures, and lengths of wash time to which one or more amylases described herein may be exposed. A low detergent concentration system is directed to wash water containing less than about 800 ppm detergent components. A medium detergent concentration system is directed to wash containing between about 800 ppm and about 2000 ppm detergent components. A high detergent concentration system is directed to wash water containing greater than about 2000 ppm detergent components. In some embodiments, the "cold water washing" of the present disclosure utilizes "cold water detergent" suitable for washing at temperatures from about 10° C. to about 40° C., from about 20° C. to about 30° C., or from about 15° C. to about 25° C., as well as all other combinations within the range of about 15° C. to about 35° C. or 10° C. to 40° C.

Different geographies have different water hardness. Hardness is a measure of the amount of calcium ($Ca^{2+}$) and magnesium ($Mg^{2+}$) in the water. Water hardness is usually described in terms of the grains per gallon (gpg) mixed $Ca^{2+}/Mg^{2+}$. Most water in the United States is hard, but the degree of hardness varies. Moderately hard (60-120 ppm) to hard (121-181 ppm) water has 60 to 181 ppm (ppm can be converted to grains per U.S. gallon by dividing ppm by 17.1) of hardness minerals.

| Water | Grains per gallon | Parts per million |
|---|---|---|
| Soft | less than 1.0 | less than 17 |
| Slightly hard | 1.0 to 3.5 | 17 to 60 |
| Moderately hard | 3.5 to 7.0 | 60 to 120 |
| Hard | 7.0 to 10.5 | 120 to 180 |
| Very hard | greater than 10.5 | greater than 180 |

Embodiments of the Present Disclosure

The following are embodiments of the present disclosure

1. A home care composition comprising a surfactant and amylase, wherein the amylase is a recombinant, non-naturally-occurring variant of a parent alpha-amylase, the variant alpha-amylase having at least 80% identity, preferably at least 85% identity, preferably at least 86% identity, preferably at least 87% identity, preferably at least 88% identity, preferably at least 89% identity, preferably at least 90% identity, preferably at least 95% identity, preferably at least 96% identity, preferably at least 97% identity, preferably at least 98% identity, or preferably at least 99% identity to SEQ ID NO: 5 and having amino acid substitutions at positions 51 and/or 125 with respect to SEQ ID NO: 5.

2. A composition according to embodiment 1, wherein the amylase comprises the amino acid substitutions T51V and/or S125R with respect to SEQ ID NO: 5.

3. A composition according to any preceding embodiment, wherein the amylase comprises amino acid substitution at positions 172, 227 and/or 231 with respect to SEQ ID NO: 5.

4. A composition according to embodiment 3, wherein the amylase comprises the amino acid substitutions N172Q, N227R and/or F231L with respect to SEQ ID NO: 5.

5. A composition according to any preceding embodiment, wherein the amylase comprises the amino acid substitutions:

(a) T51V+S125R+F231L;

(b) T51V+S125R+N172Q+N227R; or (c) N29Q+T51V+S125R+N227R+S253L+G272E+K319R+S418A, with respect to SEQ ID NO: 5.

6. A composition according to any preceding embodiment, further comprising a variant subtilisin protease from Bacillus gibsonii having the amino acid substitutions X39E, X99R, X126A, X127E and X128G.

7. A composition according to any preceding embodiment, wherein the composition is an automatic dishwashing composition.

8. A composition according to any of the preceding embodiment, wherein the composition comprises comprising a bleaching system.

9. A composition according to the preceding embodiment, wherein the composition comprises a manganese bleach catalyst selected from the group consisting of 1,4,7-trimethyl-1,4,7-triazacyclononane (Me-TACN), 1,2, 4,7- tetramethyl-1,4,7-triazacyclononane (Me/Me-TACN) and mixtures thereof.

10. A composition according to any preceding embodiment, wherein the composition comprises one or more other enzymes selected from acyl transferases, amylases, alpha-amylases, beta-amylases, alpha-galactosidases, arabinases, arabinosidases, aryl esterases, beta-galactosidases, beta-glucanases, carrageenases, catalases, cellulases, chondroitinases, cutinases, dispersins, endo-glucanases, endo-beta-mannanases, exo-beta-mannanases, esterases, exo-mannanases, galactanases, glucoamylases, hemicellulases, hexosaminidase, hyaluronidases, keratinases, laccases, lactases, ligninases, lipases, lipolytic enzymes, lipoxygenases, lysozyme, mannanases, metalloproteases, nucleases, oxidases, oxidoreductases, pectate lyases, pectin acetyl esterases, pectinases, pentosanases, perhydrolases, peroxidases, PETases, phenoloxidases, phosphatases, phospholipases, phytases, polyesterases, polygalacturonases, additional proteases, pullulanases, reductases, rhamnogalacturonases, tannases, transglutaminases, xylan acetyl-esterases, xylanases, and xylosidases; and combinations thereof.

11. A composition according to embodiment 10, wherein the one or more enzymes comprises a protease, wherein the protease is a subtilisin variant comprising three, four, or five amino acid substitutions selected from the group consisting of S039E, S099R, S126A, D127E, and F128G and further comprises one or more additional substitutions selected from the group consisting of N74D, T114L, M122L, N198A, N198G, M211E, M211Q, N212Q, and N242D, and wherein the variant has at least 80% identity to the amino acid sequence of SEQ ID NO: 6.

12. A composition according to embodiment 10, wherein the one or more enzymes comprises a protease, wherein the protease is a subtilisin variant comprising:

(i) two or more amino acid substitutions selected from the group consisting of S039E, N74D, S099R, M211E, N242D; and (ii) one or more additional substitutions selected from the group consisting of T114L, M122L, S126A, F128G, N198A, N198G, M211Q, N212Q, and wherein the variant has at least 80% identity to the amino acid sequence of SEQ ID NO: 6 or 7.

13. A composition according to embodiment 10, wherein the one or more enzymes comprises a protease, wherein the protease is selected from the group consisting of:

(a) a protease having at least 80% sequence identity to the sequence of SEQ ID NO: 6 and comprising three or more substitutions selected from: A37T, S39E, I43V, A47V, P54T, T56Y, I80V, N85S, E87D, S99R, T114Q, M122L, S126A, D127E, F128G, N198A, M211Q, N212Q and N242D, wherein the numbering is according to SEQ ID NO:6;

(b) a protease having at least 80% sequence identity to the sequence of SEQ ID NO: 8 and comprising one or more substitutions selected from: Q12L, I21V, I43V, M122L, D127P, N154S, T156A, G160S, N177V, M211N, M211S, M211L, P212D, P212H, A222S, V228I and T247N, wherein the numbering is according to SEQ ID NO:8; and (c) a protease having at least 80% sequence identity to the sequence of SEQ ID 9 and comprising three or more substitutions selected from: S9R, A15T, G59E, V66A, H118N, A188P, V199I, Q200E, N212D, Q239R, N255D, wherein the numbering is according to SEQ ID NO:9.

14. A method of cleaning comprising, contacting a surface or an item in need of cleaning with an effective amount of a composition of any preceding embodiment, and optionally further comprising the step of rinsing said surface or item after contacting said surface or item with said variant or enzyme composition.

EXAMPLES

Example 1. AA2560 α-Amylase Variants

Protein Expression, Purification and Quantitation

AA2560 α-amylase combinatorial variants based on a variant of AA2560 α-amylase described in WO2021/080948 (SEQ ID NO: 5, herein) were made as synthetic genes and introduced into suitable *Bacillus licheniformis* cells using standard procedures. All mutations were confirmed by DNA sequencing. Cells were grown for 72 hours in a medium suitable for protein expression and secretion in a *B. licheniformis* host. Secreted protein was harvested by centrifugation. Purification was achieved through use of hydrophobic interaction chromatography with Phenyl Sepharose 6 Fast Flow resin (GE Healthcare). Purified proteins were stabilized in a standard formulation buffer containing HEPES as the buffering agent, calcium chloride, and propylene glycol at pH 8. Protein concentration was determined by a mixture of amino acid analysis, high performance liquid chromatography (HPLC) and absorbance at 280 nm.

Enzyme Performance Assay

The activity of the α-amylase was determined by removal of dyed starch stain from a white melamine tile in a detergent background. Mixed corn/rice colored starch tiles and mixed corn/rice starch tiles with food colorant, purchased from Center for Testmaterials (Catalog No. DM277) were used to determine the cleaning activity of the α-amylase. The tiles were affixed to a 96-well plate containing the amylase solution diluted into a working range in an aqueous buffer and added to a pre-made detergent solution of the WFKB detergent (WFK Testgewebe GmbH, Brüggen, Deutschland) such that the total volume was 300 μL. Pre-imaged melamine tiles with colored starch stains were then affixed to the top of the 96 well plate, such that agitation of the assembly leads to splashing of the enzyme containing detergent onto the starch stained surface. The washing reaction was carried out at 50° C. for 15 minutes with shaking at 250 rpm. Following the washing reaction, the melamine tiles were then rinsed briefly under water, dried and re-imaged. The activity of the α-amylases is calculated as the difference in RGB (color) values of the pre and post wash images. The whiter the post wash image, the better the enzyme activity. Performance indices (PI) are calculated as:

$$\frac{\text{change in } RGB \text{ of variant}}{\text{change in } RGB \text{ of wild type}}$$

Performance Indices of Combinatorial Variants Against the ΔRG Variant

Cleaning performance of the variants in terms of performance index against the variant of SEQ ID NO: 5 are listed in Table 3.

TABLE 3

| Variant performance | |
|---|---|
| Variant with respect to SEQ ID NO: 5 | PI |
| T51V + S125R + F231L | 4.7 |
| T51V + S125R + N172Q + N227R | 5.9 |
| N29Q + T51V + S125R + N227R + S253L + G272E + K319R + S418A | 5.3 |

All variants in Table 3 perform better than the variant of SEQ ID NO: 5.

The dimensions and values disclosed herein are not to be understood as being strictly limited to the exact numerical values recited. Instead, unless otherwise specified, each such dimension is intended to mean both the recited value and a functionally equivalent range surrounding that value. For example, a dimension disclosed as "40 mm" is intended to mean "about 40 mm."

Every document cited herein, including any cross referenced or related patent or application, is hereby incorporated herein by reference in its entirety unless expressly excluded or otherwise limited. The citation of any document is not an admission that it is prior art with respect to any composition disclosed or claimed herein or that it alone, or in any combination with any other reference or references, teaches, suggests or discloses any such composition. Further, to the extent that any meaning or definition of a term in this document conflicts with any meaning or definition of the same term in a document incorporated by reference, the meaning or definition assigned to that term in this document shall govern.

While particular embodiments of the present disclosure have been illustrated and described, it would be obvious to those skilled in the art that various other changes and modifications can be made without departing from the spirit and scope of the disclosure. It is therefore intended to cover in the appended claims all such changes and modifications that are within the scope of this disclosure.

What is claimed is:

1. A home care composition comprising a surfactant and amylase, wherein the amylase comprises a recombinant, non-naturally-occurring variant of a parent alpha-amylase, the variant alpha-amylase comprising an amino acid sequence having at least about 80% sequence identity to the amino acid sequence of SEQ ID NO: 5 and having amino acid substitutions T51V and S125R with respect to SEQ ID NO: 5.

2. The composition according to claim 1, wherein the amylase further comprises amino acid substitution at positions 172, 227 and/or 231 with respect to SEQ ID NO: 5.

3. The composition according to claim 1, wherein the amylase further comprises the amino acid substitutions N172Q, N227R and/or F231L with respect to SEQ ID NO: 5.

4. The composition according to claim 1, wherein the amylase comprises the amino acid substitutions:

(a) T51V+S125R+F231L;

(b) T51V+S125R+N172Q+N227R; or (c) N29Q+T51V+S125R+N227R+S253L+G272E+K319R+S418A, with respect to SEQ ID NO: 5.

5. The composition according to claim 1, further comprising a variant subtilisin protease from *Bacillus gibsonii* having the amino acid substitutions X39E, X99R, X126A, X127E, and X128G.

6. The composition according to claim 1, wherein the composition is an automatic dishwashing composition.

7. The composition according to claim 1, further comprising a bleaching system.

8. The composition according to claim 1, further comprising a manganese bleach catalyst comprising manganese in complex with 1,4,7-trimethyl-1,4,7-triazacyclononane (Me-TACN), manganese in complex with 1,2,4,7-tetramethyl-1,4,7-triazacyclononane (Me/Me-TACN), or mixtures thereof.

9. The composition according to claim 1, further comprising one or more other enzymes selected from acyl transferases, amylases, alpha-amylases, beta-amylases, alpha-galactosidases, arabinases, arabinosidases, aryl esterases, beta-galactosidases, beta-glucanases, carrageenases, catalases, cellulases, chondroitinases, cutinases, dispersins, endo-glucanases, endo-beta-mannanases, exo-beta-mannanases, esterases, exo-mannanases, galactanases, glucoamylases, hemicellulases, hexosaminidase, hyaluronidases, keratinases, laccases, lactases, ligninases, lipases, lipolytic enzymes, lipoxygenases, lysozyme, mannanases, metalloproteases, nucleases, oxidases, oxidoreductases, pectate lyases, pectin acetyl esterases, pectinases, pentosanases, perhydrolases, peroxidases, PETases, phenoloxidases, phosphatases, phospholipases, phytases, polyesterases, polygalacturonases, additional proteases, pullulanases, reductases, rhamnogalacturonases, tannases, transglutaminases, xylan acetyl-esterases, xylanases, xylosidases, and combinations thereof.

10. The composition according to claim 1, further comprising a protease, wherein the protease is a subtilisin variant comprising three, four, or five amino acid substitutions selected from the group consisting of S039E, S099R, S126A, D127E, and F128G and further comprises one or more additional substitutions selected from the group consisting of N74D, T114L, M122L, N198A, N198G, M211E, M211Q, N212Q, and N242D, wherein amino acid numbering is relative to SEQ ID NO: 6, and wherein the variant comprises an amino acid sequence having at least 80% sequence identity to the amino acid sequence of SEQ ID NO: 6.

11. The composition according to claim 1, further comprising a protease, wherein the protease is a subtilisin variant comprising:

(i) two, or more amino acid substitutions selected from the group consisting of S039E, N74D, S099R, M211E, N242D; and (ii) one or more additional substitutions selected from the group consisting of T114L, M122L, S126A, F128G, N198A, N198G, M211Q, N212Q, and wherein the variant has at least about 80% identity to the amino acid sequence of SEQ ID NO: 6 or 7.

12. The composition according to claim 1, further comprising a protease, wherein the protease is selected from the group consisting of:

(a) a protease having at least about 80% sequence identity to the sequence of SEQ ID NO: 6 and comprising three or more substitutions selected from: A37T, S39E, I43V, A47V, P54T, T56Y, 180V, N85S, E87D, S99R, T114Q, M122L, S126A, D127E, F128G, N198A, M211Q, N212Q and N242D, wherein the numbering is according to SEQ ID NO:6;

(b) a protease having at least about 80% sequence identity to the sequence of SEQ ID NO: 8 and comprising one or more substitutions selected from: Q12L, 121V, I43V, M122L, D127P, N154S, T156A, G160S, N177V, M211N, M211S, M211L, P212D, P212H, A222S, V228I and T247N, wherein the numbering is according to SEQ ID NO:8; and (c) a protease having at least about 80% sequence identity to the sequence of SEQ ID 9 and comprising three or more substitutions selected from: S9R, A15T, G59E, V66A, H118N, A188P, V199I, Q200E, N212D, Q239R, N255D, wherein the numbering is according to SEQ ID NO:9.

13. A method of cleaning comprising contacting a surface or an item in need of cleaning with an effective amount of the composition of claim 1.

14. A home care composition comprising a surfactant and amylase, wherein the amylase comprises a recombinant, non-naturally-occurring variant of a parent alpha-amylase, the variant alpha-amylase comprising an amino acid sequence having at least about 80% sequence identity to the amino acid sequence of SEQ ID NO: 5 and having amino acid substitutions at positions 51 and 125 with respect to SEQ ID NO: 5, and wherein the amylase further comprises the amino acid substitutions N172Q, N227R and/or F231L with respect to SEQ ID NO: 5.

15. The composition according to claim 14, wherein the amylase comprises the amino acid substitutions T51V and S125R with respect to SEQ ID NO: 5.

16. The composition according to claim 14, further comprising a bleaching system.

17. The composition according to claim 14, further comprising a manganese bleach catalyst comprising manganese in complex with 1,4,7-tetramethyl-1,4,7-triazacyclononane (Me/Me-TACN), manganese in complex with 1,2, 4,7-tetramethyl-1,4,7-triazacyclononane (Me/Me-TACN), or mixtures thereof.

18. The composition according to claim 14, further comprising one or more other enzymes selected from acyl transferases, amylases, alpha-amylases, beta-amylases, alpha-galactosidases, arabinases, arabinosidases, aryl esterases, beta-galactosidases, beta-glucanases, carrageenases, catalases, cellulases, chondroitinases, cutinases, dispersins, endo-glucanases, endo-beta-mannanases, exo-beta-mannanases, esterases, exo-mannanases, galactanases, glucoamylases, hemicellulases, hexosaminidase, hyaluronidases, keratinases, laccases, lactases, ligninases, lipases, lipolytic enzymes, lipoxygenases, lysozyme, mannanases, metalloproteases, nucleases, oxidases, oxidoreductases, pectate lyases, pectin acetyl esterases, pectinases, pentosanases, perhydrolases, peroxidases, PETases, phenoloxidases, phosphatases, phospholipases, phytases, polyesterases, polygalacturonases, additional proteases, pullulanases, reductases, rhamnogalacturonases, tannases, transglutaminases, xylan acetyl-esterases, xylanases, xylosidases, and combinations thereof.

19. The composition according to claim 14, further comprising a protease, wherein the protease is a subtilisin variant comprising three, four, or five amino acid substitutions selected from the group consisting of S039E, S099R, S126A, D127E, and F128G and further comprises one or more additional substitutions selected from the group consisting of N74D, T114L, M122L, N198A, N198G, M211E, M211Q, N212Q, and N242D wherein amino acid numbering is relative to SEQ ID NO: 6, and wherein the subtilisin variant comprises an amino acid sequence that has at least 80% identity to the amino acid sequence of SEQ ID NO: 6.

* * * * *

SEQUENCE LISTING

```
Sequence total quantity: 9
SEQ ID NO: 1            moltype = AA  length = 486
FEATURE                 Location/Qualifiers
source                  1..486
                        mol_type = protein
                        organism = Bacillus sp.
SEQUENCE: 1
HHNGTNGTMM QYFEWHLPND GQHWNRLRND AANLKNLGIT AVWIPPAWKG TSQNDVGYGA  60
YDLYDLGEFN QKGTIRTKYG TRSQLQSAIA SLQNNGIQVY GDVVMNHKGG ADGTEWVQAV  120
EVNPSNRNQE VTGEYTIEAW TKFDFPGRGN THSSFKWRWY HFDGTDWDQS RQLNNRIYKF  180
RGTGKAWDWE VDTENGNYDY LMYADVDMDH PEVINELRRW GVWYTNTLNL DGFRIDAVKH  240
IKYSFTRDWL NHVRSTTGKN NMFAVAEFWK NDLGAIENYL HKTNWNHSVF DVPLHYNLYN  300
ASKSGGNYDM RQILNGTVVS KHPIHAVTFV DNHDSQPAEA LESFVEAWFK PLAYALILTR  360
EQGYPSVFYG DYYGIPTHGV AAMKGKIDPI LEARQKYAYG TQHDYLDHHN IIGWTREGNS  420
AHPNSGLATI MSDGPGGSKW MYVGRHKAGQ VWRDITGNRT GTVTINADGW GNFSVNGGSV  480
SIWVNK                                                             486

SEQ ID NO: 2            moltype = AA  length = 485
FEATURE                 Location/Qualifiers
source                  1..485
                        mol_type = protein
                        organism = Bacillus sp.
SEQUENCE: 2
HHNGTNGTMM QYFEWYLPND GNHWNRLNSD ASNLKSKGIT AVWIPPAWKG ASQNDVGYGA  60
YDLYDLGEFN QKGTVRTKYG TRSQLQAAVT SLKNNGIQVY GDVVMNHKGG ADATEMVRAV  120
EVNPNNRNQE VTGEYTIEAW TRFDFPGRGN THSSFKWRWY HFDGVDWDQS RRLNNRIYKF  180
RGHGKAWDWE VDTENGNYDY LMYADIDMDH PEVVNELRNW GVWYTNTLGL DGFRIDAVKH  240
IKYSFTRDWI NHVRSATGKN MFAVAEFWKN DLGAIENYLQ KTNWNHSVFD VPLHYNLYNA  300
```

-continued

```
SKSGGNYDMR NIFNGTVVQR HPSHAVTFVD NHDSQPEEAL ESFVEEWFKP LAYALTLTRE  360
QGYPSVFYGD YYGIPTHGVP AMRSKIDPIL EARQKYAYGK QNDYLDHHNI IGWTREGNTA  420
HPNSGLATIM SDGAGGSKWM FVGRNKAGQV WSDITGNRTG TVTINADGWG NFSVNGGSVS  480
IWVNK                                                             485

SEQ ID NO: 3           moltype = AA  length = 485
FEATURE                Location/Qualifiers
source                 1..485
                       mol_type = protein
                       organism = Bacillus sp.
SEQUENCE: 3
HHNGTNGTMM QYFEWYLPND GNHWNRLRSD ASNLKDKGIS AVWIPPAWKG ASQNDVGYGA  60
YDLYDLGEFN QKGTIRTKYG TRNQLQAAVN ALKSNGIQVY GDVVMNHKGG ADATEMVRAV  120
EVNPNNRNQE VSGEYTIEAW TKFDFPGRGN THSNFKWRWY HFDGVDWDQS RKLNNRIYKF  180
RGDGKGWDWE VDTENGNYDY LMYADIDMDH PEVVNELRNW GVWYTNTLGL DGFRIDAVKH  240
IKYSFTRDWI NHVRSATGKN MFAVAEFWKN DLGAIENYLN KTNWNHSVFD VPLHYNLYNA  300
SKSGGNYDMR QIFNGTVVQR HPMHAVTFVD NHDSQPEEAL ESFVEEWFKP LAYALTLTRE  360
QGYPSVFYGD YYGIPTHGVP AMKSKIDPIL EARQKYAYGR QNDYLDHHNI IGWTREGNTA  420
HPNSGLATIM SDGAGGNKWM FVGRNKAGQV WTDITGNRAG TVTINADGWG NFSVNGGSVS  480
IWVNK                                                             485

SEQ ID NO: 4           moltype = AA  length = 485
FEATURE                Location/Qualifiers
source                 1..485
                       mol_type = protein
                       organism = Bacillus sp.
SEQUENCE: 4
HHDGTNGTIM QYFEWNVPND GQHWNRLHNN AQNLKNAGIT AIWIPPAWKG TSQNDVGYGA  60
YDLYDLGEFN QKGTVRTKYG TKAELERAIR SLKANGIQVY GDVVMNHKGG ADFTERVQAV  120
EVNPQNRNQE VSGTYQIEAW TGFNFPGRGN QHSSFKWRWY HFDGTDWDQS RQLANRIYKF  180
RGDGKAWDWE VDTENGNYDY LMYADVDMDH PEVINELNRW GVWYANTLNL DGFRLDAVKH  240
IKFSFMRDWL GHVRGQTGKN LFAVAEYWKN DLGALENYLS KTNWTMSAFD VPLHYNLYQA  300
SNSSGNYDMR NLLNGTLVQR HPSHAVTFVD NHDTQPGEAL ESFVQGWFKP LAYATILTRE  360
QGYPQVFYGD YYGIPSDGVP SYRQQIDPLL KARQQYAYGR QHDYFDHWDV IGWTREGNAS  420
HPNSGLATIM SDGPGGSKWM YVGRQKAGEV WHDMTGNRSG TVTINQDGWG HFFVNGGSVS  480
VWVKR                                                             485

SEQ ID NO: 5           moltype = AA  length = 484
FEATURE                Location/Qualifiers
REGION                 1..484
                       note = Artificial variant
source                 1..484
                       mol_type = protein
                       organism = synthetic construct
SEQUENCE: 5
HHNGTNGTMM QYFEWHLPND GQHWNRLRND AANLKNLGIN AVWIPPAWKG TSQNDVGYGA  60
YDLYDLGEFN QKGTIRTKYG TRSQLQSAIA RLQNNGIQVF GDVVMNHKGG ADGTERVQAV  120
EVNPSNRNQE VTGEYTIEAW TKFDFPGRGN THSSFKWRWY HFDGTDWDQS RNLNNRIYKF  180
TGKAWDWEVD TENGNYDYLM YADVDMDHPE VINELRRWGV WYTNTLNLDG FRIDAVKHIK  240
YQFTRDWLNH VRSTTGKNNM FAVAEFWKND LGAIENYLSK TNWNHSVFDV PLHYNLYNAS  300
KSGGNYDMRQ ILNGTVVSKH PIHAVTFVDN HDSQPAEALE SFVEAWFKPL AYALILTREQ  360
GYPSVFYGDY YGIPTHGVAA MKGKIDPILE ARQKYAYGTQ HDYLDHHNII GWTREGNSAH  420
PNSGLATIMS DGPGGSKWMY VGRHKAGQVW RDITGNRTGT VTINADGWGN FSVNGGSVSI  480
WVNK                                                              484

SEQ ID NO: 6           moltype = AA  length = 269
FEATURE                Location/Qualifiers
source                 1..269
                       mol_type = protein
                       organism = Bacillus gibsonii
SEQUENCE: 6
QQTVPWGITR VQAPAVHNRG ITGSGVRVAI LDSGISAHSD LNIRGGASFV PGEPTTADLN  60
GHGTHVAGTV AALNNSIGVI GVAPNAELYA VKVLGANGSG SVSGIAQGLE WAATNNMHIA  120
NMSLGSDFPS STLERAVNYA TSRDVLVIAA TGNNGSGSVG YPARYANAMA VGATDQNNRR  180
ANFSQYGTGI DIVAPGVNVQ STYPGNRYVS MNGTSMATPH VAGAAALVKQ RYPSWNATQI  240
RNHLKNTATN LGNSSQFGSG LVNAEAATR                                   269

SEQ ID NO: 7           moltype = AA  length = 269
FEATURE                Location/Qualifiers
source                 1..269
                       mol_type = protein
                       organism = Bacillus gibsonii
SEQUENCE: 7
QQTVPWGITR VQAPAVHNRG ITGSGVRVAI LDSGISAHED LNIRGGASFV PGEPTTADLN  60
GHGTHVAGTV AALNNSIGVI GVAPNAELYA VKVLGANGRG SVSGIAQGLE WAATNNMHIA  120
NMSLGAEGPS STLERAVNYA TSRDVLVIAA TGNNGSGSVG YPARYANAMA VGATDQNNRR  180
ANFSQYGTGI DIVAPGVNVQ STYPGNRYVS MNGTSMATPH VAGAAALVKQ RYPSWNATQI  240
RNHLKNTATN LGNSSQFGSG LVNAEAATR                                   269
```

-continued

```
SEQ ID NO: 8           moltype = AA  length = 269
FEATURE                Location/Qualifiers
source                 1..269
                       mol_type = protein
                       organism = Bacillius gibsonii
SEQUENCE: 8
QQTVPWGITR VQAPTVHNRG ITGSGVKVAI LDTGIAQHSD LTIRGGASFV PGESTTADLN  60
GHGTHVAGTV AALNNSIGVI GVAPSADLYA VKVLGANGRG SVSGIAQGLE WAATNNMHIA  120
NMSLGSDAPS TTLERAVNYA TSRGVLVIAA TGNNGTGSIG YPARYANAMA VGATDQNNRR  180
ASFSQYGTGI DIVAPGVGIQ STYLNNSYAS MPGTSMATPH VAGVAALVKQ KNPSWNATQI  240
RNHLKNTATN LGNSSQFGSG LVNADAATR                                   269

SEQ ID NO: 9           moltype = AA  length = 269
FEATURE                Location/Qualifiers
source                 1..269
                       mol_type = protein
                       organism = Bacillus lentus
SEQUENCE: 9
AQSVPWGISR VQAPAAHNRG LTGSGVKVAV LDTGISTHPD LNIRGGASFV PGEPSTQDGN  60
GHGTHVAGTI AALNNSIGVL GVAPSAELYA VKVLGASGSG SVSSIAQGLE WAGNNGMHVA  120
NLSLGSPSPS ATLEQAVNSA TSRGVLVVAA SGNSGAGSIS YPARYANAMA VGATDQNNNR  180
ASFSQYGAGL DIVAPGVNVQ STYPGSTYAS LNGTSMATPH VAGAAALVKQ KNPSWSNVQI  240
RNHLKNTATS LGSTNLYGSG LVNAEAATR                                   269
```